United States Patent
Bunte et al.

(10) Patent No.: US 10,735,218 B2
(45) Date of Patent: Aug. 4, 2020

(54) DATA TRANSMISSION METHOD AND AUTOMATION-COMMUNICATION NETWORK

(71) Applicant: Beckhoff Automation GmbH, Verl (DE)

(72) Inventors: Thorsten Bunte, Gütersloh (DE); Holger Büttner, Berlin (DE); Dirk Janssen, Verl (DE); Thomas Rettig, Rheda-Wiedenbrück (DE); Hans Beckhoff, Verl (DE); Erik Vonnahme, Salzkotten (DE)

(73) Assignee: Beckhofff Automation GmbH, Verl (DE)

( * ) Notice: Subject to any disclaimer, the term of this patent is extended or adjusted under 35 U.S.C. 154(b) by 0 days.

(21) Appl. No.: 16/507,210

(22) Filed: Jul. 10, 2019

(65) Prior Publication Data
US 2019/0363906 A1    Nov. 28, 2019

Related U.S. Application Data

(63) Continuation of application No. PCT/EP2019/054661, filed on Feb. 26, 2019.

(30) Foreign Application Priority Data

May 23, 2018    (DE) .................. 10 2018 112 357

(51) Int. Cl.
*H04L 12/40*    (2006.01)
*H04L 12/403*    (2006.01)

(52) U.S. Cl.
CPC .... *H04L 12/40019* (2013.01); *H04L 12/4015* (2013.01); *H04L 12/4035* (2013.01); *H04L 2012/4026* (2013.01)

(58) Field of Classification Search
None
See application file for complete search history.

(56) References Cited

U.S. PATENT DOCUMENTS 7,702,834 B2 *  4/2010  Beckhoff .............. G05B 19/042
                                                    370/450
8,730,992 B2    5/2014  Chen et al.
(Continued)

FOREIGN PATENT DOCUMENTS

DE    10018136 A1    10/2001
DE    60037001 T2     2/2008
(Continued)

*Primary Examiner* — Henry Tsai
*Assistant Examiner* — Aurangzeb Hassan
(74) *Attorney, Agent, or Firm* — Dorsey & Whitney LLP

(57) ABSTRACT

In an automation-communication network, at least one distribution node comprises input/output interfaces each connected to at least one network segment. In a first network segment a first subscriber and in a second network segment a second subscriber are arranged. Data are exchanged between the first and the second subscriber by telegrams realized as scheduled telegrams and unscheduled telegrams. The distribution node receives an unscheduled telegram on an input/output interface and sends an unscheduled telegram on a further input/output interface. The distribution node determines a transmission duration for transmission of the unscheduled telegram. The distribution node transmits the unscheduled telegram. Prior to transmission, the distribution node deposits a first telegram information in a data field. The distribution node fragments the unscheduled telegram if the telegram cannot be transmitted within a time slot. Prior to transmission of the unscheduled telegram, the distribution node enters a second telegram information into the data field.

22 Claims, 3 Drawing Sheets

(56) References Cited

U.S. PATENT DOCUMENTS

| | | | |
|---|---|---|---|
| 2002/0064157 A1 | 5/2002 | Krause | |
| 2004/0243902 A1* | 12/2004 | Bruckner | H04L 1/0082 |
| | | | 714/746 |
| 2004/0250025 A1* | 12/2004 | Bruckner | H04L 45/54 |
| | | | 711/149 |
| 2004/0258097 A1* | 12/2004 | Arnold | G06F 1/14 |
| | | | 370/503 |
| 2005/0041653 A1* | 2/2005 | Arnold | H04L 45/00 |
| | | | 370/383 |
| 2009/0049215 A1 | 2/2009 | Nakamura | |
| 2010/0211711 A1* | 8/2010 | Kuschke | G05B 19/042 |
| | | | 710/110 |
| 2011/0283027 A1* | 11/2011 | Buesching | H04L 12/40032 |
| | | | 710/105 |
| 2013/0003754 A1* | 1/2013 | Blumenroether | G08C 19/00 |
| | | | 370/431 |
| 2015/0365252 A1* | 12/2015 | Bunte | H04L 12/6418 |
| | | | 709/208 |
| 2016/0011903 A1* | 1/2016 | Kato | G06F 16/24556 |
| | | | 718/105 |
| 2016/0292106 A1* | 10/2016 | Spiegel | H04L 12/40019 |
| 2018/0175624 A1* | 6/2018 | Trifonov | H02J 7/0068 |

FOREIGN PATENT DOCUMENTS

| | | |
|---|---|---|
| DE | 102014112082 A1 | 2/2016 |
| DE | 102017125086 A1 | 5/2019 |

\* cited by examiner

DATA TRANSMISSION METHOD AND AUTOMATION-COMMUNICATION NETWORK

CROSS-REFERENCE TO RELATED APPLICATIONS

This application claims priority to PCT Application PCT/EP2019/054661 filed Feb. 26, 2019, and German Patent Application DE 10 2018 112 357.4, filed May 23, 2018, each of which is incorporated by reference herein, in the entirety and for all purposes.

FIELD

The present invention relates to a method for transmitting data in an automation-communication network. The invention furthermore relates to an automation-communication network that is configured for transmitting data and to a distribution node that is suitable for executing the data-transmission method.

BACKGROUND

A so-called local area network (LAN) is a spatially limited network in which various network components are coupled to one another. The network components may be one or a plurality of servers and work stations, so-called nodes, that are connected to one another via communication lines in the form of coaxial, optical-fiber or twisted-pair cables. Communication between the network components within the LANs is carried out on the basis of network protocols.

In this context, the Ethernet protocol is the most widespread standard of network protocols for an LAN. Ethernet telegrams may comprise a user-data block with a length of 1500 bytes and allow for telegram-transmission rates between the individual network components within the LAN of several Gigabytes per second wherein the telegrams are transmitted in a package-oriented manner. The Ethernet protocol is also used in industrial production plants in the form of the so-called "Industrial Ethernet". In automation technology, the Ethernet protocol may e.g. serve to control data exchange in manufacturing, building and process automation with regard to control tasks and to guarantee the real-time capability of the system.

The automation-communication networks used in automation technology generally correspond to so-called "field-bus systems". Field-bus systems are bus systems in which distributed devices of a machine periphery such as input and/or output modules, drives and operational terminals are connected to control units via the bus system. A shared transmission channel (e.g. as a field bus or radio link) is provided for exchanging data. If a plurality of subscribers send telegrams at the same time, a possibility has to be provided for the subscribers of sharing the transmission channel in mutual consent. One such possibility is using the "master-slave principle".

Usually, the control units at the field bus are the active bus subscribers, in the following referred to as "master subscribers". The master subscribers are provided with the access rights of the field-bus system and determine the data flow on the field bus in the form of telegrams. The passive field-bus subscribers, in the following referred to as "slave subscribers", mostly correspond to the peripheral machine devices. The slave subscribers do not have access rights and may only acknowledge received data or, respectively, telegrams or transmit data or, respectively, telegrams upon request by the master subscriber.

Distribution nodes that are also referred as "switches" are frequently used in automation-communication networks in order to connect the individual network segments having network components to one another and to ensure that the data or, respectively, telegrams within the network segments quickly reach their destination. The telegrams to be transmitted in the automation-communication network may be cyclic real-time telegrams that are relevant for controlling the automation system and comprise cyclic input/output data of the subscribers, and acyclic non-real-time telegrams that e.g. comprise parameters or status data of the subscribers. Cyclic real-time telegrams are in general scheduled telegrams having a fixed transmission time for being transmitted by the distribution nodes, whereas acyclic non-real-time telegrams frequently occur in the telegram flow in an unscheduled manner and do not have a fixed transmission time for being transmitted.

In order to forward the scheduled cyclic real-time telegrams, a switching table, a so-called "routing list", is deposited in the distribution node that e.g. comprises a telegram identification, e.g. in the form of a MAC address, an input/output interface and a transmission time. In contrast to the described "routing list" for the scheduled cyclic telegrams, the "routing list" for the unscheduled acyclic non-real-time telegrams does not comprise a transmission time as the unscheduled acyclic telegrams do not have a transmission time.

In order to ensure that the forwarding of non-real-time telegrams that will in the following be referred to as unscheduled telegrams will not delay the forwarding of real-time telegrams that will in the following be referred to as scheduled telegrams, a data-transmission cycle for the telegrams is divided up into three time sections in the distribution node of U.S. Pat. No. 8,179,923 B2.

In a first time section, the so-called "cyclic time section", only scheduled telegrams may be received and forwarded. In the subsequent second time section referred to as "acyclic time section", the unscheduled telegrams are transmitted. In the third and last time section, the so-called "transitional time section", acyclic telegrams can further be received, but must not be forwarded.

The transitional time section that at least corresponds to the maximum forwarding time for an unscheduled telegram prevents that a delayed transmission of scheduled telegrams occurs in the subsequent cyclic time section due to the forwarding of an unscheduled acyclic telegram still being in process. The unscheduled acyclic telegrams received in the transitional time section are buffered in the distribution node and transmitted in the next acyclic time section.

In the distribution node, an overload of unscheduled telegrams may easily occur because each distribution node may transmit unscheduled telegrams outside of the cyclic time section, e.g. within the acyclic time section, in an uncontrolled manner. Such overloads particularly occur when the acyclic time section in the telegram or, respectively, data-transmission cycle is considerably shortened compared to the cyclic time section. Due to the operating times within the automation-communication network and in order to achieve down times that are as short as possible during telegram or, respectively, data transmission, the scheduled telegrams are frequently not transmitted directly one after the other in the cyclic time section, but with intermediate time gaps. As a result, the cyclic time section extends. In such a case, there is a danger of the receiving buffer for the unscheduled telegrams in the distribution node overflowing if too many unscheduled telegrams are received in the transitional time period and in the acyclic time section.

Moreover, according to the procedure described in U.S. Pat. No. 8,179,923 B2, the automation-communication network comprising the distribution node has to be previously set up during a configuration phase. If changes occur in the scheduled telegrams that are transmitted in the cyclic time section, a new configuration has to be generated and stored in the distribution node. If a plurality of distribution nodes is used in the automation-communication network, the new configuration has to be additionally transmitted to the distribution nodes. This means that such a change in the configuration may take up several data-transmission cycles. In U.S. Pat. No. 8,179,923 B2, the unscheduled telegrams may only be transmitted in the acyclic phase. An unscheduled telegram is then fully transmitted in the time slot in which no scheduled telegrams are transmitted. However, the disadvantage of the method of U.S. Pat. No. 8,179,923 B2 is that the unscheduled telegram has to have a length that at most corresponds to the remaining time slot until the next scheduled telegram is transmitted so that the acyclic telegram can be transmitted within this free time slot.

SUMMARY

A method for transmitting data in an automation-communication network having at least one distribution node provides an efficient throughput of telegrams in the distribution node, in particular of unscheduled telegrams, furthermore an improved automation-communication network.

EXAMPLES

According to one aspect, a method for transmitting data in an automation-communication network having at least one distribution node is provided. The distribution node comprises a plurality of input/output interfaces that are each connected to at least one network segment, wherein in a first network segment in the automation-communication network a first subscriber and in a second network segment a second subscriber are arranged. A data exchange between the first subscriber and the second subscriber is carried out in the form of telegrams, wherein the telegrams are realized as scheduled telegrams characterized by a fixed transmission time for transmission by the at least one distribution node, and as unscheduled telegrams characterized by not having a fixed transmission time for transmitting by the at least one distribution node. The unscheduled telegrams are each assigned control data for the distribution node and the control data have a data field that is processed by the distribution node. The distribution node is configured to receive the unscheduled telegram on an input/output interface and to send it on a further input/output interface. Moreover, the distribution node is configured to determine a transmission duration for transmitting the unscheduled telegram and to determine a time slot of the input/output interface remaining until transmission of a next scheduled telegram, wherein the input/output interface is provided as the transmission interface for the unscheduled telegram. Furthermore, the distribution node examines whether the telegram with the transmission duration can be transmitted within the remaining time slot. The distribution node is configured to transmit the unscheduled telegram via the transmission interface if the unscheduled telegram having the transmission duration can be transmitted within the time slot of the transmission interface remaining until transmission of the next scheduled telegram. Prior to transmitting the unscheduled telegram, the distribution node enters a first telegram information into the data field of the control data of the telegram. The first telegram information indicates that the unscheduled telegram is transmitted in full. The distribution node is moreover configured to fragment the unscheduled telegram if the telegram having the transmission duration cannot be transmitted within the time slot of the transmission interface remaining until transmission of the next scheduled telegram. Furthermore, the distribution node enters a second telegram information into the data field of the control data of the unscheduled telegram prior to transmitting the unscheduled telegram, wherein the second telegram information indicates that the unscheduled telegram is going to be fragmented and comprises an additional distribution-node identification that serves to discern the individual distribution nodes in the automation-communication network.

According to another aspect, an automation-communication network having at least one distribution node is provided. The distribution node comprises a plurality of input/output interfaces that are each connected to at least one network segment, wherein in a first network segment a first subscriber and in a second network segment a second subscriber are arranged. Data are exchanged between the first subscriber and the second subscriber in the form of telegrams. The telegrams are realized as scheduled telegrams characterized by a fixed transmission time for transmitting via the at least one distribution node and as unscheduled telegrams characterized by not having a fixed transmission time for transmitting via the at least one distribution node. The unscheduled telegrams are each assigned control data for the distribution node and the control data comprise a data field that is processed by the distribution node. The distribution node is configured to receive an unscheduled telegram on an input/output interface and to send an unscheduled telegram on a further input/output interface. The distribution node is further configured to determine a transmission duration for transmission of the unscheduled telegram. Also the distribution node is configured to determine a time slot of the input/output interface provided as the transmitting interface for the unscheduled telegram, said time slot remaining until a next scheduled telegram is transmitted, and to examine whether the unscheduled telegram with said transmitting duration can be transmitted within the remaining time slot. The distribution node is moreover configured to transmit the unscheduled telegram via the transmission interface if the unscheduled telegram with said transmission duration can be transmitted within the remaining time slot of the transmitting interface until the next scheduled telegram is transmitted. Furthermore the distribution node is configured to enter a first telegram information prior to the transmission of the unscheduled telegram into the data field of the control data of the unscheduled telegram, wherein the first telegram information indicates that the unscheduled telegram is fully transmitted. The distribution node is configured to fragment the unscheduled telegram if the telegram with the transmission duration cannot be transmitted within the remaining time slot of the transmission interface up until transmission of the next scheduled telegram. The distribution node is moreover configured to enter a second telegram information in the data field of the control data of the unscheduled telegram prior to transmitting the unscheduled telegram, wherein the second telegram information indicates that the telegram is going to be fragmented and comprises an additional distribution-node identification that serves to discern the individual distribution nodes in the automation-communication network.

According to another aspect, a distribution node for an automation-communication network is provided. The distribution node having a plurality of input/output interfaces that are each connected to at least one network segment, wherein in a first network segment a first subscriber and in a second network segment a second subscriber are arranged. Data are exchanged between the first subscriber and the second subscriber in the form of telegrams. The telegrams are realized as scheduled telegrams characterized by a fixed transmission time for transmitting via the at least one distribution node and as unscheduled telegrams characterized by not having a fixed transmission time for transmitting via the at least one distribution node. The unscheduled telegrams are each assigned control data for the distribution node and the control data comprise a data field that is processed by the distribution node. The distribution node is configured to receive an unscheduled telegram on an input/output interface and to send an unscheduled telegram on a further input/output interface. Furthermore the distribution node is configured to determine a transmission duration for transmitting the unscheduled telegram. Moreover the distribution node is configured to determine a time slot of the input/output interface provided as the transmitting interface for the unscheduled telegram, said time slot remaining until a next scheduled telegram is transmitted, and to examine whether the unscheduled telegram with said transmitting duration can be transmitted within the remaining time slot. The distribution node transmits the unscheduled telegram via the transmission interface if the unscheduled telegram with said transmission duration can be transmitted within the remaining time slot of the transmitting interface until the next scheduled telegram is transmitted. The distribution node also enters a first telegram information prior to the transmission of the unscheduled telegram into the data field of the control data of the unscheduled telegram, wherein the first telegram information indicates that the unscheduled telegram is fully transmitted. The distribution node fragments the unscheduled telegram if the telegram with the transmission duration cannot be transmitted within the remaining time slot of the transmission interface up until transmission of the next scheduled telegram. The distribution node enters a second telegram information in the data field of the control data of the unscheduled telegram prior to transmitting the unscheduled telegram, wherein the second telegram information indicates that the telegram is going to be fragmented and comprises an additional distribution-node identification that serves to discern the individual distribution nodes in the automation-communication network.

BRIEF DESCRIPTION OF THE DRAWINGS

The above-described properties, features and advantages as well as the manner in which they are achieved will become clearer and better to understand in context with the following description of embodiment examples that will be explained in more detail in conjunction with the schematic drawings, in which.

DETAILED DESCRIPTION

Figure 1:
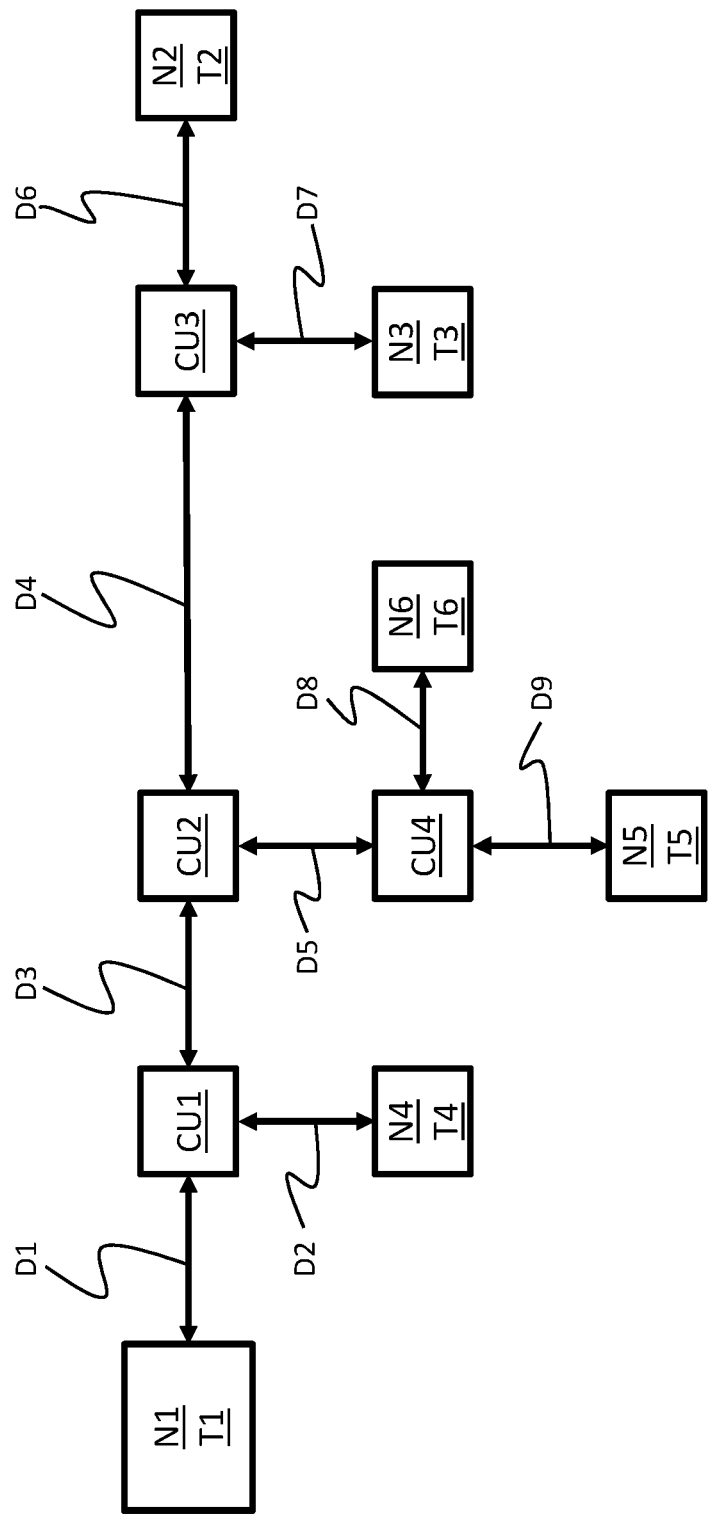
FIG. 1 shows a schematic design of an automation-communication network having a plurality of distribution nodes and network segments.

In conjunction with the following figures, examples of a method for transmitting data in an automation-communication network, e.g. used within the framework of manufacturing, building and process automation, are described. In this context, the indication of use is not to be considered limiting; other areas of an automation-communication network may be used in which a first subscriber is arranged in a first network segment, a second subscriber is arranged in a second network segment and at least one distribution node is arranged between the two subscribers.

It is to be noted that the figures are only schematic and not drawn to scale. Hence, components and elements shown in the figures may be depicted excessively large or reduced for a better understanding. Moreover, it is to be noted that the reference numerals in the figures remain unchanged if they refer to identically embodied elements and/or components and/or quantities.

Automation-communication networks are generally realized as field-bus systems in which the subscribers are interlinked via the field bus. The subscribers may exchange data with control units, wherein usually real-time-capable network protocols are used for this purpose. Data exchange between the subscribers on the field bus is frequently controlled according to a master-slave-administration principle. The active bus subscribers that are also referred to as master subscribers correspond to the control units that determine and coordinate data transmission on the field bus. The passive bus subscribers that are referred to as slave subscribers and do not have bus-access rights, on the other hand, are the devices of the machine periphery. Thereby, a passive bus subscriber may simply receive messages, acknowledge them and transmit data or, respectively, telegrams upon request by the master subscriber. The devices of the machine periphery may e.g. correspond to input and/or output components that connect the sensors or actuators of a machine or plant to one another via the field bus. Alternatively, the input and/or output components may be directly integrated into the sensors or actuators of the machine or of the plant.

In automation technology, a cyclic control process may be triggered by the master subscriber and be carried out by means of a data exchange between the master subscriber and the slave subscriber via the field bus. For this purpose, the master subscriber transmits the output data as scheduled telegrams on the field bus, wherein the slave subscriber extracts the output data assigned to it from the telegram in order to process the output data to result in data that, in turn, are transmitted back to the master subscriber and serve as input data for the master subscriber in the next cyclic control process. Such scheduled telegrams are also referred to as "cyclic telegrams" or, respectively, as "real-time telegrams".

Apart from real-time telegrams that are relevant when carrying out control tasks, unscheduled so-called "acyclic telegrams" are transmitted on the field bus, as well. Unscheduled telegrams are telegrams that are not cyclically repeated on the field bus and are thus not real-time-relevant. For example, these telegrams may comprise parameterization and configuration data or diagnosis information. Acyclic telegrams are for this reason also referred to as "non-real-time telegrams".

Field-bus systems the administrative structure of which is based on the master-slave principle may be operated by various network protocols. The Ethernet protocol, for example, represents the most wide-spread standard of network protocols for a local network (LAN). Ethernet telegrams may comprise a user-data block having a length of 1500 bytes and allow for telegram-transmission rates between the individual network components within the LANs of several gigabytes/second. The Ethernet protocol is used in industrial manufacturing plants or machines of an automation system, as well, in the form of the so-called "Industrial Ethernet", wherein the Ethernet protocol is in this context supposed to guarantee the real-time demands of the automation system. The EtherCAT protocol, for example, is such a protocol that is based on the Ethernet-protocol technology and may be used in real-time-capable automation systems.

The special feature of the EtherCAT protocol is that the processing of user data in the user-data block of the EtherCAT telegram that may comprise the above-mentioned scheduled or, respectively, unscheduled telegrams is carried out by the slave subscriber already during telegram circulation. In this manner, quick data processing may be provided in the automation-communication system by the EtherCAT protocol, which may e.g. be advantageously used for real-time systems.

The EtherCAT telegram comprises datagrams which each comprise a control-data field and a user-data field. The control-data field comprises a command field which informs the slave subscriber on the manner in which it is to process the user data of the scheduled or, respectively, unscheduled telegram: for example, whether the slave subscriber is to insert data into the user-data field of the scheduled or, respectively, unscheduled telegram in a writing operation, or whether it should at first extract data from the user-data field and subsequently insert data into the user-data field in a write/read operation, or, respectively, whether the slave subscriber should only extract data from the user-data field in a read operation. Moreover, the control-data field comprises an address field. In the address field, the data area in the slave subscriber is determined by mean of which the slave subscriber is to exchange data during circulation of the user data field.

After receiving the control-data field in the datagram of the EtherCAT telegram, the slave subscriber starts to evaluate the command field or the address field. If the slave subscriber is addressed, it extracts the output data intended for it from the user-data field in case of a read or, respectively, write/read datagram, while the datagram in the EtherCAT telegram circles through the slave subscriber. If the datagram is a write or, respectively, a write/read datagram, the corresponding slave subscriber inserts the input data in the user-data field in the datagram during circulation. Processing the circling datagrams by the slave subscribers only minimally delays the EtherCAT telegram.

The following will be described in conjunction with the EtherCAT-telegram circulation. However, any other Ethernet protocol applicable in real-time systems may be used. Moreover, the method may be realized with a standard Ethernet protocol. Likewise, it is possible to use a non-Ethernet-based automation-communication network in which a first subscriber is arranged in a first network segment and a second subscriber is arranged in a second network segment as well as at least one distribution node comprising a plurality of input/output interfaces, furthermore not limited to an automation network having a hierarchical master-slave-administration structure.

In the automation-communication network, the individual network segments with subscribers are connected to one another by one or a plurality of distribution node(s) that may be realized as so-called "switches". The distribution nodes further serve to coordinate the data exchange of the subscribers in the network segments as scheduled cyclic and unscheduled acyclic telegrams and to forward the scheduled and unscheduled telegrams to their destination on time. The corresponding distribution nodes comprise a plurality of input/output interfaces which are each connected to at least one network segment, wherein in a first network segment a first subscriber and in a second network segment a second subscriber is arranged. The distribution node is configured to receive the scheduled and unscheduled telegrams on an input/output interface and to transmit them on a further input/output interface.

The scheduled and unscheduled telegrams are each assigned control data for the respective distribution node. They comprise a data field that is processed by the respective distribution node. Before the respective distribution node transmits an unscheduled telegram, the distribution node determines a transmission duration for transmitting the corresponding unscheduled telegram. In addition, the respective distribution node determines a time slot of the input/output interface of the distribution node provided as transmission interface for the unscheduled telegram, said time slot remaining until the next scheduled telegram is transmitted.

Due to stored information on the scheduled telegrams, the transmission times that are usually determined by the first subscriber, the master subscriber, for the individual distribution nodes, the distribution nodes know how long a corresponding data-transmission path to the superordinate distribution nodes is going to remain free, e.g. on the way back. This means that time slots of the transmission interface of the corresponding distribution node remaining until the next scheduled telegram is sent are known or, respectively, may be determined in a simple manner in order to decide whether the unscheduled telegram with the transmission time can be transmitted within the above-mentioned time slot of the transmission interface of the distribution node in full or divided up into fragments.

If the corresponding distribution node has determined both time values, it examines whether the unscheduled telegram with the respective transmission duration can be transmitted within the time slot remaining until the next scheduled telegram of the transmission interface of the distribution node is sent. If this is the case, the distribution node transmits the unscheduled telegram in full. In addition, the distribution node inserts a first telegram information into the data field of the control data of the unscheduled telegram that indicates that the unscheduled telegram is fully transmitted. If the result of the distribution node's examination, however, is that the unscheduled telegram with the time duration cannot be transmitted within the time slot of the transmission interface remaining until the next scheduled telegram is sent, the respective distribution node fragments the unscheduled telegram.

Moreover, the respective distribution node inserts a second telegram information into the data field of the control data of the unscheduled telegram prior to transmission, wherein the second telegram information indicates that the unscheduled telegram has been fragmented and it comprises an additional distribution-node identification that serves to discern the individual distribution nodes if a plurality of distribution nodes for connecting the network segments is arranged in the automation-communication network. Furthermore, the first telegram information in the data field of the control data of the unscheduled telegram may comprise the distribution-node identification of the respective distribution node.

Fragmenting the telegrams is usually on the way back of the telegram circulation, because on the forward run the first subscriber, i.e. the master subscriber, determines in the first network segment when the scheduled telegrams may be transmitted via the distribution node to the second subscriber, the slave subscriber in the second network segment. Due to this determination, telegram collisions may be avoided. This is, however, different when the scheduled or, respectively, unscheduled telegrams are sent on the way back from the slave subscriber to the master subscriber. In this context, collisions may be prevented of the respective distribution node examines whether the time slot of the transmission interface of the distribution node remaining until transmission of the next scheduled telegram is sufficient for sending the unscheduled telegram with the transmission duration in order to transmit the unscheduled telegram fully or, as the case may be, divided up into fragments if the corresponding data-transmission path happens to be free.

By means of the proposed procedure, the telegram circulation in the automation-communication network may be optimized. In this context, the main idea is the optimal utilization of the time slot of the transmission interface of the distribution node for transmission of the unscheduled telegram that remains until transmission of the next scheduled telegram. This is possible because the distribution nodes know due to the stored transmission times of the scheduled telegrams how long the respective data-transmission path to the next distribution node is going to remain free. As a result, the unscheduled telegram may be transmitted in said remaining time slot without affecting circulation of the scheduled telegram. Thus, the present method, the automation-communication network and the distribution node are advantageously suitable for transmitting the unscheduled acyclic telegrams since in this manner, the existing capacity for transmitting of those telegrams may be used in the best possible way. Consequently, the proposed method, automation-communication network and distribution node have the advantage that it reduce the down time in telegram transmission due to efficient use of the remaining time slot of the transmission interface of the distribution node to a minimum.

The corresponding distribution node transmits the fragmented unscheduled telegram via its transmission interface, together with the second telegram information it enters into the data field of the control data of the telegram prior to transmitting the unscheduled telegram. The second telegram information informs other distribution nodes or, respectively, the first subscriber in the automation-communication network that the fragmented unscheduled telegram is not a complete unscheduled telegram, but that further telegram fragments are necessary for completeness. The information that during fragmentation of the unscheduled telegram further telegram fragments are transmitted are inserted into the second telegram information by the corresponding distribution node, as well.

In addition, the second telegram information in the data field of the control data of the unscheduled telegram allows to discern the respective distribution node in the automation-communication network by the distribution-node identification. The distribution-node identification moreover allows to assign the individual telegram fragments to an associated unscheduled telegram as the respective distribution-node identifications of the distribution nodes for an unscheduled telegram comprising a plurality of telegram fragments do not change. The distribution-node identification of the individual distribution nodes is, however, increased with regard to its value for a new unscheduled telegram which is fragmented. Likewise, the distribution-node identification for a new unscheduled telegram that is not fragmented is increased. Only in case of a scheduled telegram, the distribution-node identification is not incremented.

A method for transmitting data in an automation-communication network having at least one distribution node as well as a corresponding automation-communication network are provided. The distribution node comprises a plurality of input/output interfaces that are each connected to at least one network segment, wherein in a first network segment in the automation-communication network a first subscriber and in a second network segment a second subscriber are arranged. A data exchange between the first subscriber and the second subscriber is carried out in the form of telegrams, wherein the telegrams are realized as scheduled telegrams characterized by a fixed transmission time for transmission by the at least one distribution node, and as unscheduled telegrams characterized by not having a fixed transmission time for transmitting by the at least one distribution node. The unscheduled telegrams are each assigned control data for the distribution node and the control data have a data field that is processed by the distribution node. The distribution node is configured to receive the unscheduled telegram on an input/output interface and to send it on a further input/output interface. Moreover, the distribution node is configured to determine a transmission duration for transmitting the unscheduled telegram and to determine a time slot of the input/output interface remaining until transmission of a next scheduled telegram, wherein the input/output interface is provided as the transmission interface for the unscheduled telegram. Furthermore, the distribution node examines whether the telegram with the transmission duration can be transmitted within the remaining time slot. The distribution node is configured to transmit the unscheduled telegram via the transmission interface if the unscheduled telegram having the transmission duration can be transmitted within the time slot of the transmission interface remaining until transmission of the next scheduled telegram. Prior to transmitting the unscheduled telegram, the distribution node enters a first telegram information into the data field of the control data of the telegram. The first telegram information indicates that the unscheduled telegram is transmitted in full. The distribution node is moreover configured to fragment the unscheduled telegram if the telegram having the transmission duration cannot be transmitted within the time slot of the transmission interface remaining until transmission of the next scheduled telegram. Furthermore, the distribution node enters a second telegram information into the data field of the control data of the unscheduled telegram prior to transmitting the unscheduled telegram, wherein the second telegram information indicates that the unscheduled telegram is going to be fragmented and comprises an additional distribution-node identification.

The automation-communication network may e.g. be used in automation technology in order to exchange data or, respectively, scheduled and unscheduled telegrams between the individual network subscribers by distribution nodes. In this context, the method for transmitting data may be advantageously used in the automation-communication network as the distribution node knows—due to stored information on the scheduled telegrams, the transmission times of which are usually determined for the individual distribution noes by the first subscriber—how long a corresponding data-transmission path to the superordinate distribution node is going to be free e.g. on the way back of the unscheduled telegram from the second to the first subscriber. This means that the remaining time slot of the transmission interface of the respective distribution node remaining until transmission of the next scheduled telegram is known or, respectively, is easy to determine, and as a result a decision may be taken on whether an unscheduled telegram having the transmission duration may be transmitted in full or in fragments within the above-mentioned time slot of the transmission interface of the distribution node.

Within the framework of the procedure, the possibility that unscheduled telegrams that cannot be transmitted back to the subscriber within the time slot of the transmission interface of the distribution node remaining until transmission of the next scheduled telegram may be fragmented may prove advantageous. For this purpose, the distribution node inserts a second telegram information into the control data of the unscheduled telegram prior to transmission of the unscheduled telegram, which indicates that the unscheduled telegram has been fragmented. In addition, the second telegram information comprises the distribution identification. If, however, the distribution node does not fragment the unscheduled telegram because the unscheduled telegram with the transmission duration can be transmitted during the time slot of the transmission interface of the distribution node remaining until transmission of the next scheduled telegram, the distribution nodes generates the first telegram information that indicates that the unscheduled telegram is going to be transmitted in full.

Thus, the procedure may allow for an ideal utilization of the potential free time slot of the transmission interface of the distribution node remaining until transmission of the next scheduled telegram and provide the advantage that down time during telegram or, respectively, data transmission is reduced to a minimum. The overflow danger of the receiving buffer of the distribution node due to the incoming unscheduled telegrams may additionally be reduced by the fragmented transmission of the unscheduled telegrams.

A plurality of distribution nodes can be arranged between the first subscriber and the second subscriber. The respective distribution node is assigned a separate data field of the control data of the unscheduled telegram that is independently processed by the respective distribution node. The respective distribution node fragments the unscheduled telegram that is transmitted by the second subscriber to the first subscriber, if the unscheduled telegram with the respective transmission time cannot be transmitted within the time slot of the transmission interface remaining for transmission of the next scheduled telegram by the respective distribution node. In addition, prior to transmitting the unscheduled telegram the respective distribution node inserts a second telegram information into the data field of control data of the unscheduled telegram assigned to it, wherein the second telegram information indicates that the unscheduled telegram is going to be fragmented and comprises an additional distribution-node identification. Subsequently, the respective distribution node transmits the unscheduled telegram in fragments. By arranging a plurality of distribution nodes between the first and the second subscriber, a throughput of unscheduled telegrams may be reliably controlled in the automation-communication network and collisions of scheduled and unscheduled telegrams may be prevented in this manner.

Between the first and second subscriber, a plurality of distribution nodes may be arranged which may render transmission of the unscheduled telegrams more efficient as a result. Each distribution node is then assigned a corresponding separate data field in the control data of the unscheduled telegram in which the respective distribution node deposits the first telegram information if it fully transmits the unscheduled telegram, or, respectively, the second telegram information if the distribution node fragments the unscheduled telegram. Multiple fragmenting of the unscheduled telegram by various distribution nodes is another possibility of realizing telegram transmission.

The separate data field assigned to the respective distribution node may be divided up as desired, wherein the data-field structure may in an automation-communication network having a plurality of distribution nodes repeat itself for other data fields of further distribution nodes. This on the one hand simplifies programming during implementation of the procedure and furthermore provides faster processing and transmitting of the data within the automation-communication network if the distribution nodes only have to evaluate or, respectively, to supplement the part of the control data that is relevant for them.

The distribution-node identification of the second telegram information can allow for additional assigning to the corresponding unscheduled telegram, wherein the distribution node is embodied to increment the distribution-node identification of the second telegram information for a new unscheduled telegram. Apart from characterizing the respective distribution node, the distribution-node identification also serves to characterize the corresponding unscheduled telegram, as the distribution-node identification of the respective distribution nodes does not change for several telegram fragments of an unscheduled telegram. It is, however, incremented for a new unscheduled telegram in the automation-communication network, with regard to its value, in order to provide a discerning feature for further unscheduled telegrams. As telegram transmission may also be realized such that a plurality of distribution nodes subdivide the unscheduled telegram into several telegram fragments, a high flexibility may be provided by the distribution-node identification during transmission of the unscheduled telegram in the automation-communication network as well as easy recognition of the individual telegram fragments.

The respective distribution node can note a telegram offset in the data field of the control data of the unscheduled telegram assigned to it, in the second telegram information, if the respective distribution node fragments the unscheduled telegram. The telegram offset indicates a value n that comprises a position of a first user-data block contained in the unscheduled telegram, wherein the first telegram fragment particularly has the telegram-offset value n=0. The telegram offset allows for the subsequent distribution node to which the unscheduled fragmented telegram is sent to quickly determine the position of the user-data block and thus to start processing the user data promptly. For the recipient, the structure of the unscheduled telegram may be easy to recognize by the telegram offset. An unscheduled telegram that has not been divided up into telegram fragments may also have the telegram-offset value n=0.

The respective distribution node can deposit in the data field of control data of the unscheduled telegram assigned to it, in the second telegram information, that more telegram fragments are to be transmitted if the respective distribution node fragments the unscheduled telegram. By depositing the information in the data field of the control data of the unscheduled telegram that further telegram fragments are to be transmitted, the subsequent distribution nodes are informed on the fragmenting of the unscheduled telegram. As a result, they know that further telegram fragments may follow the transmitted telegram fragment. This simplifies assembling the telegram fragments on the receiving side and may increase reliability of the telegram or, respectively, data transmission.

The telegrams can be transmitted on a closed data-transmission path, starting from the first subscriber to the second subscriber on the forward run, and on the way back starting from the second subscriber to the first subscriber. The first subscriber arranged in the first network segment is realized as a master subscriber and the second subscriber arranged in the second network segment is realized as a slave subscriber. The master subscriber is embodied to trigger the data exchange between the master and the slave subscriber in the form of telegrams. In this context, the telegrams are realized as scheduled telegrams having the fixed transmission duration for transmission by at least one distribution node, and as unscheduled telegrams without the fixed transmission time. Moreover, the master subscriber is embodied to generate a data header for the unscheduled telegrams to be transmitted to the slave subscriber on the forward run, the data header comprising a control section and subsequent to it a separate distribution-node-data field for each distribution node to be run through. Moreover, the distribution node generates a data header for the unscheduled telegrams of the slave subscriber to be transmitted to the master subscriber on the way back, said header comprising a control section and a distribution-node-data field if the unscheduled telegram does not comprise a data header on the way back. The subsequent distribution nodes supplement the data header of the unscheduled telegram by the distribution-node-data field assigned to the respective distribution node for the unscheduled telegrams to be transmitted.

By embodying the subscribers as a master-slave-arrangement, the bus-access rights as well as the telegram throughput of the field-bus system may be implemented in a simple manner. In this context, the master subscriber generates the data header of the scheduled or, respectively, unscheduled telegrams that comprises the control section and subsequent to it the distribution-node-data field assigned to the respective distribution node. The master subscriber sends the scheduled or unscheduled telegram with the mentioned data header to the respective distribution nodes in the automation-communication network, wherein the number of individual distribution-node-data fields of the scheduled or unscheduled telegrams informs on the distribution nodes used in the automation-communication network for telegram transmission. On the forward run, only the master sends scheduled or unscheduled telegrams via the distribution nodes to the slave. In this way, the master prevents telegram collisions during transmission as it sends the scheduled or, respectively, unscheduled telegrams to the slaves in a controlled manner.

On the way back, however, it may occur that in an automation-communication network in which a plurality of slave subscribers are arranged, a plurality of slave subscribers simultaneously transmit unscheduled or, respectively, scheduled telegrams to the master subscriber which may lead to telegram collisions in the respective distribution node. However, the respective distribution node knows due to the stored information on the scheduled telegrams, the transmission times of which are usually determined by the master for the individual distribution nodes, how long a corresponding data-transmission path to a superordinate distribution node is going to be free on the way back of the unscheduled telegram. For this reason, the distribution node may examine whether the unscheduled telegram with the transmission duration may be transmitted within the time slot of the transmission interface of the distribution node remaining until transmission of the next scheduled telegram. If this is not the case, the respective distribution node may fragment the unscheduled telegram on the way back, and provided that the unscheduled telegram does not have a data header on its way back, generate the data header for the unscheduled telegram. As a result, fragmenting of an unscheduled telegram is usually on the way back when transmitting the unscheduled telegram back to the master subscriber.

In the data header of the unscheduled telegram that may correspond to the above-mentioned control data, the corresponding distribution node may deposit the second telegram information in the distribution-node-data field which may correspond to the above-described data field, wherein the second telegram information indicates that the distribution node has fragmented the unscheduled telegram as well as comprises the distribution-node identification. The subsequent distribution nodes supplement the data header by the distribution-node-data field assigned to the respective distribution node and the first telegram information in case that the unscheduled telegram is transmitted in full, and the second telegram information in case that the unscheduled telegram is fragmented, including the distribution-node identification of the respective distribution node.

The control section of the unscheduled telegram can comprise a length information of the unscheduled telegram, wherein said length information of the unscheduled telegram comprises the length of the data header and a length of the user-data block of the unscheduled telegram. The transmission duration of the unscheduled telegram is determined by the length of the unscheduled telegram. In order to fragment the unscheduled telegram, at first the first distribution node fully receives the unscheduled telegram on the way back to the master subscriber so that the length of the unscheduled telegram is known. The subsequent distribution noes may read the length of the unscheduled telegram from the control data of the unscheduled telegram. By the telegram length and the time slot of the transmission interface remaining until transmission of the next scheduled telegram by the distribution node, the first distribution node may then fragment the unscheduled telegram, wherein the fragmented unscheduled telegram has a minimum fragment length for transmitting the fragmented unscheduled telegram. The individual telegram fragments may vary with regard to telegram length, but are not below a minimum fragment length. By inserting the length information in the front area of the unscheduled telegram, in its control section, the subsequent distribution nodes may additionally decide at the earliest possible point in time whether the unscheduled telegram can be fully forwarded through the respective distribution node or whether it is to be fragmented by the respective distribution node.

The control section of the unscheduled telegram has a counter indicating the number of distribution nodes to be run through by the unscheduled telegram starting from the master subscriber up to the slave subscriber, or, respectively, the number of distribution nodes to be run through by the unscheduled telegram starting from the slave subscriber back to the master subscriber. The distribution node decrements the counter during the run of the telegram on the run forward from the master to the slave. Moreover, the distribution node increments the counter during the run of the telegram on the way back from the slave to the master. By the counter in the control section of the unscheduled telegram, each distribution node is informed on the number of subsequent distribution nodes during transmission of the unscheduled telegram. In this manner, a reliable telegram or, respectively, data transmission may be provided, and it becomes particularly possible to differentiate between the data header and user data of the unscheduled telegram.

The scheduled telegrams may be realized as cyclic telegrams, wherein the cyclic telegrams may serve to control an automation system. Moreover, the unscheduled telegrams may be realized as acyclic telegrams. Differentiating between scheduled cyclic telegrams and unscheduled acyclic telegrams may have an advantageous effect on the telegram circulation in the automation network, as the scheduled cyclic telegrams usually correspond to real-time telegrams that may be relevant for controlling the automation system and thus have a fixed transmission time for transmission by the at least one distribution node. In contrast thereto, the unscheduled acyclic telegrams corresponding to non-real-time telegrams do not have a fixed transmission time for transmission. As a result, unscheduled telegrams may be transmitted in the time slots in which no scheduled telegrams are sent, without affecting the transmission of the scheduled telegrams.

FIG. 1 shows a schematic structure of an automation-communication network having a plurality of distribution nodes and network segments. The automation-communication network comprises four distribution nodes CU1, CU2, CU3, CU4, that may be connected to one another via a field bus and may have a memory. The topology of the automation-communication network provides that a first network segment N1 may be connected to a first input/output interface of the first distribution node CU1. Via a first data-transmission path D1. The first subscriber may be a master subscriber; however, this is not obligatory for the main idea.

Via a second input/output interface as well as via a second data-transmission path D2, the first distribution node CU1 is connected to a fourth network segment N4 comprising a fourth subscriber T4. Apart from the shown fourth subscriber T4 in the fourth network segment N4, the fourth network segment N4 may comprise further subscribers. The fourth subscriber T4 may e.g. be a slave subscriber if the administrative hierarchy of the automation-communication network is to be based on the master-slave principle.

A third input/output interface of the first distribution node CU1 and a third data-transmission path D3 serve to connect the first distribution node CU1 to a first input/output interface of a second distribution node CU2. The second distribution node CU2 comprises a second input/output interface that is connected to a third distribution node CU3 by a fourth data transmission path D4 and a first input/output interface. Moreover, the second distribution node CU2 has a third input/output interface that is connected to a first input/output interface of a fourth distribution node CU4 via a fifth transmission path D5.

The third distribution node CU3 comprises a second input/output interface that is connected to a third network segment N3 by a seventh data-transmission path D7, the third network segment N3 comprising a third subscriber T3.

Instead of the shown third subscriber T3, a plurality of subscribers may be arranged in the third network segment N3. The third subscriber T3 or the potential plurality of subscribers may be one or a plurality of slave subscribers.

In addition, the third distribution node CU3 comprises a third input/output interface that is connected to a second network segment N2 and a second subscriber T2 arranged therein via a sixth data-transmission path D6. The second subscriber T2 may e.g. be a slave subscriber. In addition, the second network segment N2 may comprise further subscribers.

By a second input-output interface of the fourth distribution node CU4, the fourth distribution node CU4 may be connected to a sixth network segment N6 comprising a sixth subscriber T6 by an eighth data-transmission path 68. The sixth network segment N6 may comprise further subscribers. The depicted sixth subscriber T6 may e.g. be a slave subscriber.

A third input/output interface of the fourth distribution node CU4 may serve to connect the fourth distribution node CU4 to a fifth network segment N5 and a fifth subscriber T5 by a ninth data-transmission path D9. The fifth network segment N5 may also comprise a plurality of subscribers, as shown in FIG. 1. The fifth subscriber T5 may e.g. be a slave subscriber.

Alternatively, the first to sixth subscriber T1-T6 or one of the first to sixth subscribers T1-T6 may be a subscriber embodied in a different manner; e.g. a standard Ethernet subscriber is conceivable. The data transmission in the automation-communication network shown in FIG. 1 may be carried out on the basis of a unified network protocol, e.g. the EtherCAT protocol. In addition, in case of differing embodiments of the individual subscribers in the network segments, various network protocols may be used in the automation-communication network. The master subscriber is then embodied in such a way that it may process the various network protocols used in the automation-communication network.

The illustration chosen in FIG. 1 with double arrows between the first to sixth subscriber T1-T6 in the first to sixth network segment N1-N6 and the first to fourth distribution node CU1-CU4 indicates that a bi-directional data transmission is possible between the first to sixth subscriber T1-T6 and the first to fourth distribution node CU1-CU4 on the forward run and on the way back. The first to ninth data-transmission path D1-D9 between the distribution node CU1-CU4 and subscribers T1-T6 also comprises a forward run and a way back. Consequently, data may be transmitted in the form of scheduled and unscheduled telegrams between the individual subscribers T1-T6 on a closed data-transmission path in the automation-communication network. Moreover, the depiction of four distribution nodes CU1, CU2, CU3, CU4 is not to be considered obligatory as more or less distribution nodes may similarly be arranged within the network. Moreover, the number of individual input/output interfaces of the distribution nodes may deviate from the described number of input/output interfaces. Moreover, it is conceivable to realize the automation-communication network with a larger or smaller number of network segments and/or subscribers.

Subsequently, a data exchange in form of the unscheduled telegrams between the first subscriber T1 in the first network segment N1 and the second subscriber T2 in the second network N2 is described. In this context, the first subscriber T1 may be a master subscriber and the second subscriber T2 may be a slave subscriber. The first subscriber T1 puts a data header ahead of each unscheduled EtherCAT telegram in which the second subscriber T2 or further non-depicted subscribers in the second network segment N2 are to carry out a writing operation in which the data are to be written into a user-data field of the unscheduled EtherCAT telegram. This data header contains information for the distribution nodes CU1, CU2, CU3 arranged between the first and the second subscriber T1, T2 in the automation-communication network with regard to forwarding the unscheduled telegrams.

In the exemplary configuration of the automation-communication network of FIG. 1, three distribution nodes CU1, CU2, CU3 are arranged between the first subscriber T1 of the first network segment N1 and the second subscriber T2 of the second network segment N2. According to this, the data header put ahead of the unscheduled EtherCAT telegram that is generated by the first subscriber T1 comprises a separate data section for each distribution node CU1, CU2, CU3 which is in the following referred to as data field. The data header of the unscheduled EtherCAT telegram comprises a control section apart from the individual data fields of the distribution nodes CU1, CU2, CU3. The control section comprises an identification information by which a distribution node CU1, CU2, CU3 recognizes that the unscheduled telegram is an extended unscheduled EtherCAT telegram and that it is further assigned a data field. Moreover, the control section comprises a counter that indicates the number of distribution nodes CU1, CU2, CU3 to be run through by the unscheduled telegram starting from the first subscriber T1 up to the second subscriber T2 in the second network segment N2. In the shown example, the counter indicates three distribution nodes CU1, CU2, CU3. Moreover, the control section of the data header comprises a length information of the unscheduled telegram comprising the entire telegram length including the data header.

Figure 2A:
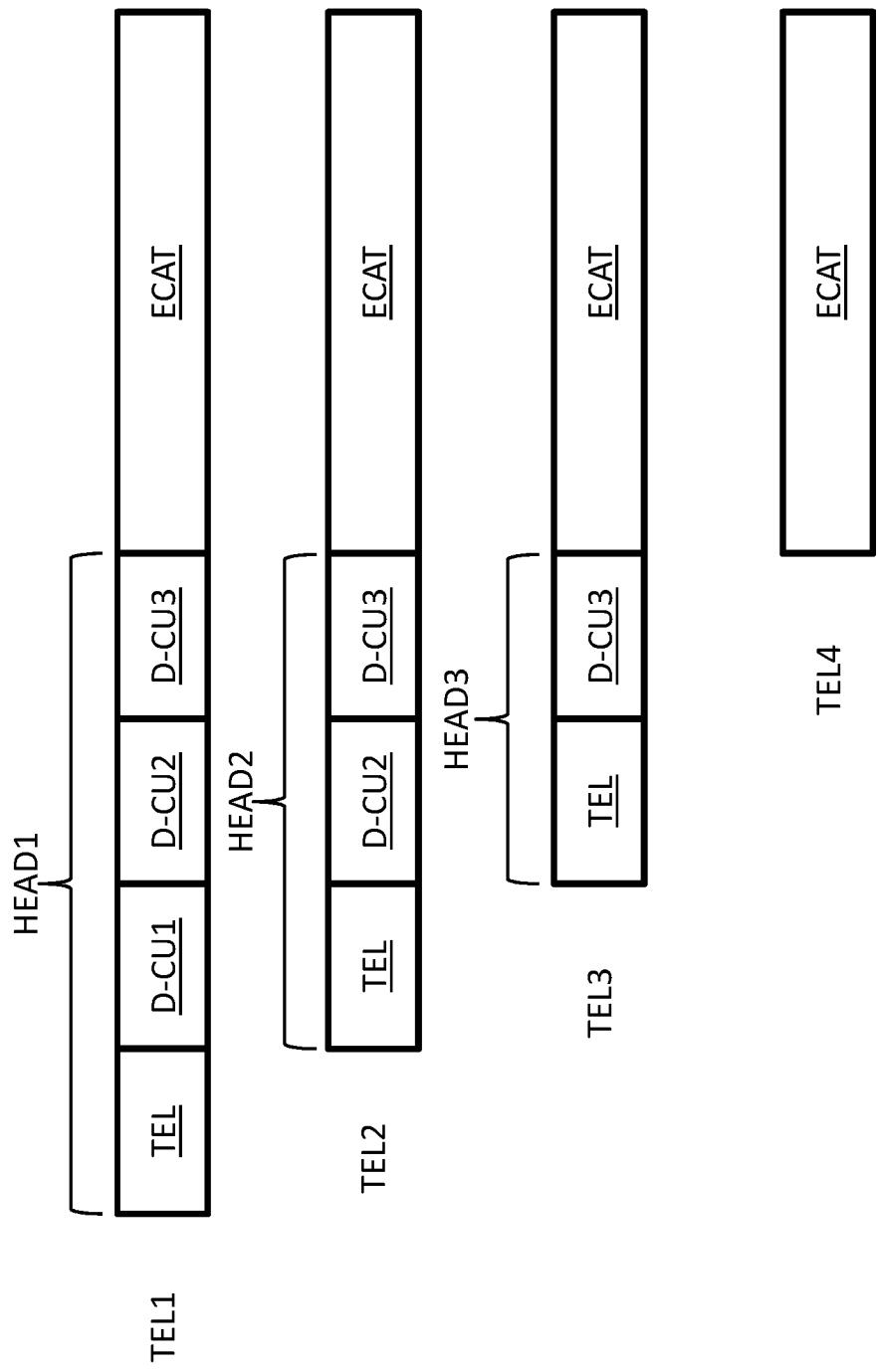
FIG. 2A depicts a schematic principle of an unscheduled telegram for exchanging data between the first subscriber and the second subscriber in the automation-communication network shown in FIG. 1, wherein three distribution nodes are arranged between the two subscribers and transmission of the unscheduled telegram is shown on the forward run to the second subscriber.
Figure 2B:
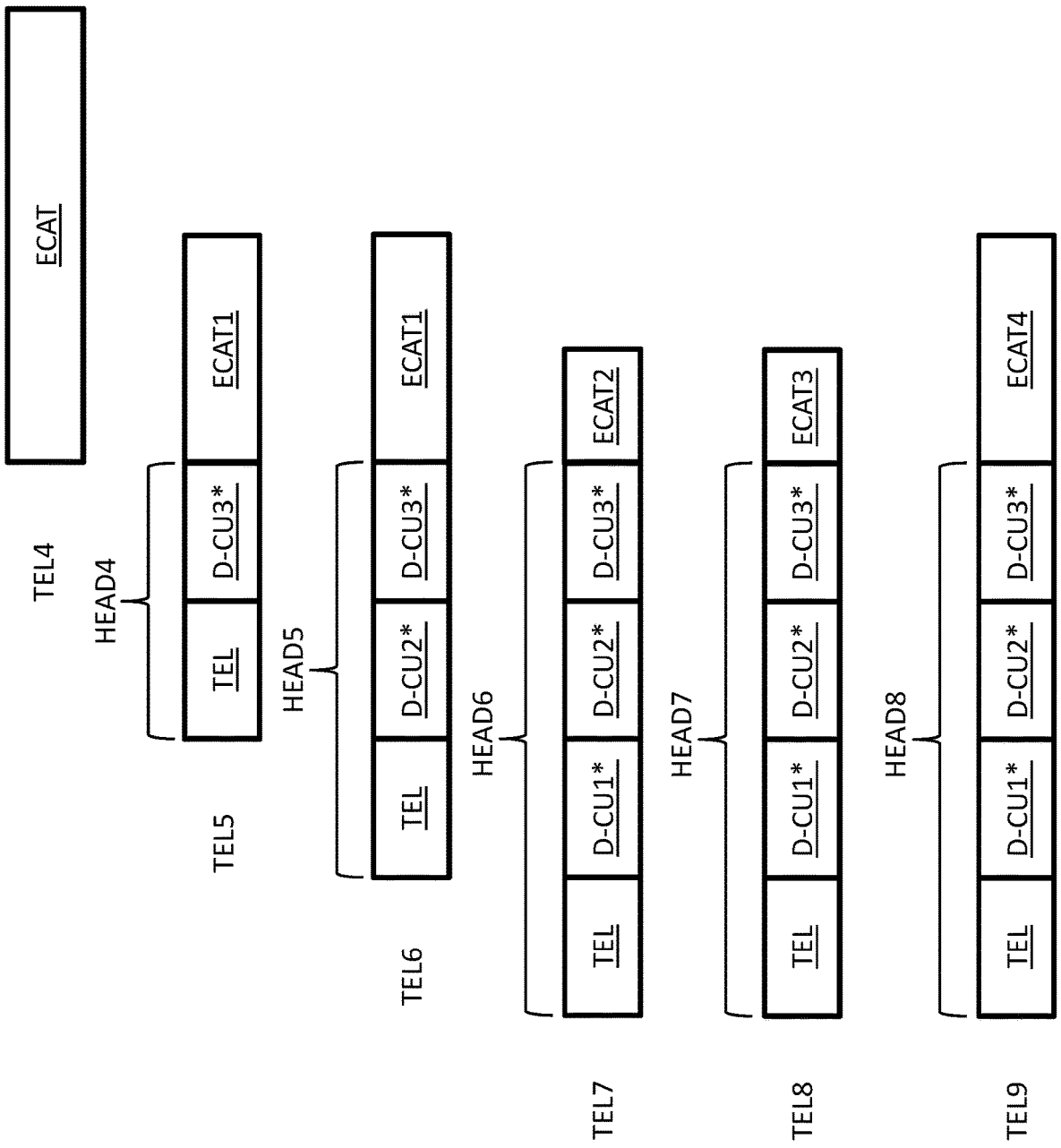
FIG. 2B depicts a schematic principle of an unscheduled telegram for exchanging data between the first and the second subscriber in the automation-communication network shown in FIG. 1, wherein three distribution nodes are arranged between the two subscribers and the transmission of the unscheduled telegram that is divided up into telegram fragments is shown on the way back to the first subscriber.

FIGS. 2A and 2B schematically depict the extended unscheduled EtherCAT telegram that apart from the actual EtherCAT telegram further comprises the data header for exchanging data between the first subscriber T1 shown in FIG. 1 and the second subscriber T2 in the second network segment N2. FIG. 2A shows the schematic structure of the unscheduled telegram on the forward run to the second subscriber T2 and FIG. 2B illustrates the schematic telegram structure on the way back, starting from the second subscriber T2 to the first subscriber T1 in which the unscheduled telegram is subdivided into fragments. FIG. 2A shows the outputting of the unscheduled telegram by the first subscriber T1 as well as after circulation of the unscheduled telegram through the individual distribution nodes CU1, CU2, CU3 on the forward run of the unscheduled telegram and FIG. 2B shows the telegram structure after processing by the second subscriber T2 and after circulation through the distribution nodes CU1, CU2, CU3 on the way back.

A first telegram structure TEL1 in FIG. 2A shows the unscheduled telegram sent by the first subscriber in the first network segment via the first data-transmission path to the first input/output interface of the first distribution node. The unscheduled telegram comprises a first data header HEAD1 put ahead of the EtherCAT telegram ECAT. The first data header HEAD1 comprises a control section TEL. The control section TEL comprises an identification information that indicates an extended unscheduled EtherCAT telegram. By the identification information, a distribution node may recognize that it is assigned a data field D-CU1, D-CU2, D-CU3. Moreover, the control section TEL comprises a counter. The counter indicates the distribution nodes to be run through by the unscheduled telegram. Moreover, the control section TEL comprises a length indication of the unscheduled telegram that indicates the entire length of the unscheduled telegram, including the first data header HEAD1.

In the first data header HEAD1, three data fields D-CU1, D-CU2, D-CU3 go along with the control section TEL, wherein the first data field D-CU1 is assigned to the first distribution node, the second data field D-CU2 is assigned to the second distribution node and the third data field is assigned to the third distribution node. The individual data fields D-CU1, D-CU2, D-CU3 in the first data header HEAD1 of the unscheduled telegram are as a result arranged in the same order in which the unscheduled telegram passes the individual distribution nodes.

The first distribution node receives the unscheduled telegram as described above and starts to process the unscheduled telegram. The distribution node at first evaluates the first data header HEAD1 starting with the identification information of the control section TEL and recognizes by the identification information that the unscheduled telegram comprises a first data header HEAD1 put ahead of the EtherCAT telegram, that the unscheduled telegram is an extended EtherCAT telegram. By the counter in the control section TEL of the unscheduled telegram, the first distribution node recognizes that for transmitting the unscheduled telegram two further distribution nodes will follow. For example, for the number of distribution nodes run through by the unscheduled telegram on the forward run to the second subscriber T2, the counter shows the value three. In an alternative embodiment of the automation-communication network of FIG. 1 or in case of another target subscriber in a further network segment, the counter may also show a deviating value for the number of distribution nodes to be run through.

The first distribution node reduces (decrements) the counter with the number of distribution nodes to be run through to e.g. the value two, and extracts the first data field D-CU1 assigned to the first distribution node and following upon the control section TEL from the first data header HEAD1 of the unscheduled telegram. After this, the first distribution node stores the first data field D-CU1 assigned to it in its memory and forwards the unscheduled telegram shortened by the first data field D-CU1 via the third input/output interface of the first distribution node. The shortened unscheduled telegram having the telegram structure TEL2 is shown in FIG. 2A below the first telegram structure TEL The information on the first data field D-CU1 deposited by the first distribution node in its memory may normally be deleted when the unscheduled telegram has been processed by the first distribution node on the way back. In case of losses that may occur when the unscheduled telegram is transmitted, the memory of the first distribution node may overflow. It is then possible to proceed according to the so-called FIFO principle (first in, first out) and to delete the oldest information. This procedure is also conceivable in case of information from scheduled telegrams, for the case that the scheduled telegram arrives very late at the master subscriber on its way back from the slave subscriber and the corresponding entry on the information of the first data field D-CU1 in the memory of the first distribution node has already been deleted. As a result, the returning scheduled telegram would be treated as a returning unscheduled telegram, which, however, is unproblematic due to the lateness of the scheduled telegram. A conceivable alternative is to introduce time stamps and to delete the old entries in the memory of the first distribution node after expiry of a maximum retaining period.

The second distribution node processes the shortened unscheduled telegram having the telegram structure TEL2 in analogy to the above-described processing of the unscheduled telegram having the telegram structure TEL1. The second distribution node first evaluates the second data header HEAD2 put ahead of the EtherCAT telegram ECAT and determines by the counter in the control section TEL of the second data header HEAD2 that a further distribution node following thereafter is for transmitting the unscheduled telegram. The second distribution node then decrements the counter of the control section TEL in the second data header HEAD2 of the unscheduled telegram, e.g. to result in the value one, and extracts the second data field D-CU2 assigned to the second distribution node from the second data header HEAD2 of the unscheduled telegram. The second data field D-CU2 is arranged between the control section TEL and the third data field D-CU3 in the second data header HEAD2 of the unscheduled telegram.

The second distribution node deposits the second data field D-CU2 assigned to it in its memory, as described above. Likewise, what was mentioned above with regard to the duration of information storage may apply analogously. Moreover, the second distribution node forwards the again shortened unscheduled telegram with the third telegram structure TEL3 of FIG. 2A via its second input/output interface. The again shortened unscheduled telegram is transmitted to the third distribution node via the fourth data-transmission path, wherein the third distribution node receives the unscheduled telegram on its first input/output interface.

When processing the again shortened unscheduled telegram having the third telegram structure TEL3, the third distribution node proceeds analogously when processing the shortened unscheduled telegram and the initially unscheduled telegram of the other two distribution noes. The third distribution node at first evaluates the control section TEL of the third data header HEAD3 of the again shortened unscheduled EtherCAT telegram. By the counter in the control section TEL, the third distribution node recognizes that no further distribution node follows for transmission of the again shortened unscheduled telegram. As a result, the third distribution node also extracts, apart from the data field D-CU3 assigned to it and arranged after the control section TEL in the third data header HEAD3, the control section TEL from the third data header HEAD3 of the telegram. Thereby, the third distribution node reduces the again shortened unscheduled telegram with the third telegram structure TEL3 to the EtherCAT telegram ECAT, without data header, having the fourth telegram structure TEL4 shown in FIG. 2A.

The third distribution node stores the third data field D-CU3 assigned to it in its memory. Moreover, the third distribution node deposits another control information from the EtherCAT telegram ECAT in its memory. During storing of the mentioned information, the above-described may analogously apply. Said control information may serve to identify the unscheduled EtherCAT telegram ECAT. It is e.g. possible that the third distribution node uses the identification information, the so-called "Destination-MAC-ID (DEST-MAC-ID)" comprising the EtherCAT telegram ECAT itself. The Destination-MAC-ID is explained in more detail below in conjunction with Table 1. The third distribution node furthermore transmits the unscheduled EtherCAT telegram ECAT via its second input/output interface and the sixth data-transmission path D6 to the second network segment having the second subscriber T2.

In the second network segment N2, further subscribers may be arranged apart from the second subscriber T2 and be configured as slave subscribers, such as the second subscriber T2. The second input/output interface of the third distribution node CU3 forms a closed data-transmission path having a forward run and a way back in conjunction with the sixth data-transmission path D6 and the second network segment N2 having the second subscriber T2 as a slave subscriber. The unscheduled EtherCAT telegram ECAT may be processed by the slave subscriber during circulation. Usually, processing during circulation is carried out on the forward run of the unscheduled EtherCAT telegram ECAT, but may also take place on the way back of the unscheduled EtherCAT telegram ECAT.

The slave subscriber respectively extracts the output data assigned to it by the first subscriber T1 which may be embodied as the master subscriber from the unscheduled EtherCAT telegram ECAT and may, depending on the kind of processing (read, write or read/write operation) insert input data for the master subscriber. After processing of the unscheduled EtherCAT telegram ECAT by the slave subscriber arranged in the second network segment N2, the third distribution node CU3 retrieves the unscheduled EtherCAT telegram ECAT on its second input/output interface according to the fourth telegram structure TEL4.

FIG. 2B again shows the unscheduled EtherCAT telegram ECAT with the fourth telegram structure TEL4 as a starting point. The unscheduled EtherCAT telegram ECAT is supplemented with the data header on the way back of the unscheduled telegram to the first subscriber T1 that may be embodied as a master subscriber, the data header being extended by the individual distribution notes CU3, CU2, CU1 to be run through one after the other in inverted order. For identifying the unscheduled EtherCAT telegram ECAT, the third distribution node CU3 uses, as described above, the identification information which the third distribution node CU3 has stored on the forward run and which is comprised by the unscheduled EtherCAT telegram ECAT itself.

As it may occur on the way back of the telegram transmission to the first subscriber T1 that a plurality of subscribers that may be arranged in the same or in differing network segments transmit simultaneously, the respective distribution node checks prior to transmission of the unscheduled telegram via the respective data-transmission path to the next distribution node whether the time slot of the input/output interface of the distribution node provided as transmission interface (e.g. the first input/output interface) remaining until transmission of the next scheduled telegram is sufficient for transmitting the corresponding unscheduled telegram. For this purpose, the respective distribution node, e.g. the third distribution node CU3, first examines the transmission time of the unscheduled telegram to be transmitted. If the third distribution node CU3 receives the complete unscheduled EtherCAT telegram ECAT having the fourth telegram structure TEL4, the length of the unscheduled telegram from which the transmission time of the unscheduled telegram may be learnt is known. Alternatively, the third distribution node CU3 may determine the length of the unscheduled telegram from the identification information of the data header of the unscheduled telegram and the stored information via the third data field D-CU3, as well. For example, the third distribution node CU3 may forward the unscheduled telegram in a cut-through procedure which has the advantage of less delay during circulation. Complete receipt of the unscheduled telegram by the third distribution node CU3 is absolutely obligatory if the automation-communication network is not realized according to the master-slave hierarchy and a network protocol deviating from the EtherCAT protocol is used for telegram transmission.

The third distribution node CU3 then generates the fourth data header HEAD4 and puts it ahead of the unscheduled EtherCAT telegram ECAT. The fourth data header HEAD4 comprises the control section TEL comprising the identification information showing the individual distribution nodes that the data header of the unscheduled telegram has a data field assigned to the respective distribution node. Moreover, the identification information shows that the unscheduled telegram is an extended EtherCAT telegram ECAT. In addition, the control section TEL has a counter indicating the number of distribution nodes to be run through when transmitting the unscheduled telegram back to the first subscriber, and the length information providing the entire length of the telegram.

If the unscheduled telegram having the time duration can be transmitted within the time slot of the transmission interface (the first input/output interface) of the distribution node remaining until transmission of the next scheduled telegram, e.g. the third distribution node CU3 inserts a first telegram information into the data field DCU3* of the fourth data header HEAD4 assigned to it, which indicates that the third distribution node CU3 fully transmits the unscheduled EtherCAT telegram ECAT.

If, however, the unscheduled telegram with the transmission time cannot be transmitted within the transmission-free time of the transmission interface (the first input/output interface) of the distribution node, e.g. the third distribution node CU3 generates a second telegram information in the data field D-CU3* assigned to it. The second telegram information indicates that the third distribution node CU3 fragments the unscheduled telegram. In addition, the second telegram information comprises the distribution-node identification that serves to discern the individual distribution nodes. The third distribution node CU3 fragments the EtherCAT telegram ECAT, wherein the telegram fragment ECAT1 should at least have a minimum fragment length. The schematic structure of the unscheduled first EtherCAT telegram fragment ECAT1 that the third distribution node CU3 sends via its first input/output interface to the second input/output interface of the second distribution node CU2 may e.g. correspond to the extended fifth telegram structure TEL5 of FIG. 2B.

In the following Table 1, a possible structure of the fourth data header HEAD4 with regard to the extended fifth telegram structure TEL5 is shown.

TABLE 1

| Byte number | Data header section | Denotation |
|---|---|---|
| 0-5 | TEL | DEST-MAC-ID |
| 6-7 | TEL | TEL-LEN |
| 8 | D-CU3* | CMD (value 4) |
| 9 | D-CU3* | FRAME-ID (value X3) |
| 10-11 | D-CU3* | OFFSET (value 0) |
| 12 | D-CU3* | NEXT (value 1) |
| 13-15 | D-CU3* | RESERVE |

Bytes 0 to 7 of data header HEAD4 are reserved for the control section TEL of the telegram. Therein, the bytes 0 to 5 comprise the identification information DEST-MAC-ID which indicates to the second distribution node CU2 that it is an extended unscheduled telegram. In addition, the second distribution node CU2 may determine via the identification information that the data header HEAD4 of the unscheduled telegram has a data field D-CU3* assigned to the third distribution node CU3.

A byte of the identification information DEST-MAC-ID is moreover used as a counter. The counter indicates how many distribution nodes have to be run through, starting from the second subscriber T2 to the first subscriber T1, wherein the counter initially has the value one. Furthermore, the bytes 6 and 7 of the control section TEL have a length information TEL-LEN of the unscheduled telegram, wherein the length information renders the entire length of the unscheduled telegram (including the data header).

Byte 8 of the data field D-CU3* comprises the second telegram information, wherein the second telegram information indicates that the third distribution node CU3 has fragmented the unscheduled EtherCAT telegram ECAT1. The fragmenting of the unscheduled telegram is identified by the value CMD=4. Byte 9 of the data field D-CU3* comprises the distribution-node identification FRAME-ID of the second telegram information, wherein the distribution-node identification FRAME-ID of the third distribution node CU3 has the value X3. By the distribution-node identification, the respective distribution node is identified. In addition, the distribution-node identification allows for assigning the unscheduled telegram fragments to an EtherCAT telegram ECAT as their value is increased for a further unscheduled telegram.

Bytes 10 to 11 of the data field D-CU3* of the second telegram information comprise the telegram offset OFFSET, wherein the first EtherCAT-telegram fragment ECAT1 obtains the offset value=0. The telegram offset OFFSET indicates the position of the first user data block contained in the first EtherCAT-telegram fragment ECAT1, wherein the user data block may correspond to the above-described user data field.

Byte 12 of the data field D-CU3* of the second telegram information NEXT indicates that due to fragmentation of the unscheduled EtherCAT telegram ECAT1 further telegram fragments are to be transmitted, which is characterized by the value NEXT=1.

Bytes 13-15 of the data field C-CU3* RESERVE correspond to reserved bytes that cannot be occupied.

Alternatively, the third distribution node CU3 may transmit the unscheduled EtherCAT telegram to the second distribution node CU2 in a non-fragmented manner and indicate in a first telegram information in the data field D-CU3* assigned to it that the unscheduled telegram is transmitted in an non-fragmented manner, as well as its distribution-node identification X3 that may further be comprised in the first telegram information. The structure of the described non-fragmented telegram is not separately shown in FIG. 2B.

The second distribution node CU2 receives the extended unscheduled first EtherCAT telegram fragment having the fifth telegram structure TEL5 on its second input/output interface and determines that the unscheduled telegram comprises a data header HEAD4 put ahead of the actual first EtherCAT telegram fragment ECAT1 which may be structure according to Table 1. By the stored information of the scheduled telegrams comprising their transmission times, the second distribution node CU2 may determine in connection with the telegram lengths of the scheduled telegrams whether it can immediately forward the unscheduled telegram or whether the second distribution node CU2 has to buffer the unscheduled telegram, because from the above-mentioned transmission times and telegram lengths of the scheduled telegrams, the distribution node may determine the time slot it may use until an unscheduled telegram is transmitted.

The second distribution node CU2 starts with evaluating the data header HEAD4, e.g. of the identification information DEST-MAC-ID in the control section TEL. The second distribution node CU2 increments the counter by one, so that it indicates the value two and furthermore inserts the data field D-CU2* assigned to the second distribution node CU2 into the data header HEAD5 of the unscheduled telegram fragment ECAT1 between the control section TEL in the data header HEAD5 of the unscheduled telegram fragment ECAT1 and to the data field D-CU3* of the third distribution node CU3. For example, the remaining time slot of the transmission interface (the first input/output interface) of the second distribution node provided for sending may in the shown example be sufficient for transmitting the unscheduled first telegram fragment ECAT1 having the sixth telegram structure TEL6 and the transmission time, so that the second distribution node CU2 does not have to fragment the first EtherCAT telegram fragment ECAT1 again. Then, the second distribution node CU2 indicates that it fully transmits the unscheduled first EtherCAT telegram fragment ECAT1 by a first telegram information in the data field D-CU2* of the data header HEAD5 of the second distribution node. Moreover, the first telegram information may comprise an additional first EtherCAT telegram fragment ECAT1 in the data field D-CU2* of the control section TEL of the unscheduled first EtherCAT telegram fragment ECAT1 in order to allow for an assignment to the second distribution node CU2. For example, the distribution-node identification FRAME-ID of the second distribution node CU2 may comprise the value X2.

The data header HEAD5 of the unscheduled first EtherCAT-telegram fragment ECAT1 having the sixth telegram structure TEL6 which the second distribution node CU2 sends to the first distribution node CU1 may e.g. be structured as shown in Table 2.

TABLE 2

| Byte number | Data header section | Denotation |
|---|---|---|
| 0-5 | TEL | DEST-MAC-ID |
| 6-7 | TEL | TEL-LEN |
| 8 | D-CU2* | CMD (value 3) |
| 9 | D-CU2* | FRAME-ID (value X2) |
| 10-15 | D-CU2* | RESERVE |
| 16 | D-CU3* | CMD (value 4) |
| 17 | D-CU3* | FRAME-ID (value X3) |
| 18-19 | D-CU3* | OFFSET |
| 20 | D-CU3* | NEXT (value 1) |
| 21-23 | D-CU3* | RESERVE |

In analogy to Table 1 that describes the structure of data header HEAD4, bytes 0 to 7 are reserved for the control section TEL of the unscheduled first telegram fragment ECAT1. Bytes 0 to 5 comprise the identification information DEST-MAC-ID, as described above, one byte of the identification information DEST-MAC-ID represents the counter and bytes 6 to 7 indicate the telegram length TEL-LEN of the first EtherCAT telegram fragment ECAT1.

Byte 8 of the data field D-CU2* comprises the first telegram information which shows by the value CMD=3 that the second distribution node CU2 fully transmits the unscheduled first telegram fragment ECAT1 via its first input/output interface to the first distribution node CU1 and does not carry out any further fragmentations.

Byte 9 of the data field D-CU2* may in the first telegram information furthermore comprise the distribution-node identification FRAME-ID with the value X2 of the second distribution node CU2.

Bytes 10 to 15 of the data header HEAD5 of the unscheduled first telegram fragment ECAT1 having the structure TEL6 may be embodied as reserved bytes RESERVE.

Bytes 16 to 23 may have the structure of data field D-CU3* described above in Table 1 and assigned to the third distribution node CU3 and be occupied in the same way as described in Table 1.

Alternatively, it is conceivable that the second distribution node CU2 again fragments the unscheduled first telegram fragment ECAT1 and then inserts additional information into the data header HEAD5 via the re-fragmented unscheduled first telegram fragment ECAT1.

The first distribution node CU1 receives the unscheduled first telegram fragment ECAT1 that was sent via the third data-transmission path D3 via its third input/output interface and proceeds analogously when evaluating the unscheduled first telegram fragments ECAT1, as the second distribution node CU2. The first distribution node CU1 e.g. starts with evaluating the identification information DEST-MAC-ID in the control section TEL of the data header HEAD5. The first distribution node CU1 increments the counter by one so that it indicates the value three and further adds the data field D-CU1* to the data header HEAD6 of the unscheduled telegram fragment ECAT1 assigned to the first distribution node CU1 between the control section TEL in the data header HEAD5 of the unscheduled telegram fragment ECAT1 and the data field D-CU2* of the second distribution node CU2. The again extended unscheduled first EtherCAT telegram fragment may e.g. have the seventh telegram structure TEL7.

If the first distribution node CU1 again subdivides the re-extended unscheduled first telegram fragment ECAT1 into e.g. two fragments ECAT2, ECAT3 before forwarding it to the first subscriber T1 in the first network segment N1, the data header HEAD6 of the re-extended telegram having the second telegram fragment ECAT2 and the seventh telegram structure TEL7 may e.g. be structured as in Table 3.

TABLE 3

| Byte number | Data header section | Denotation |
|---|---|---|
| 0-5 | TEL | DEST-MAC-ID |
| 6-7 | TEL | TEL-LEN |
| 8 | D-CU1* | CMD (value 4) |
| 9 | D-CU1* | FRAME-ID (value X1) |
| 10-11 | D-CU1* | OFFSET |
| 12 | D-CU1* | NEXT (value 1) |
| 13-15 | D-CU1* | RESERVE |
| 16 | D-CU2* | CMD (value 3) |
| 17 | D-CU2* | FRAME-ID (value X2) |
| 18-23 | D-CU2* | RESERVE |
| 24 | D-CU3* | CMD (value 4) |
| 25 | D-CU3* | FRAME-ID (value X3) |
| 26-27 | D-CU3* | OFFSET |
| 28 | D-CU3* | NEXT (value 1) |
| 29-31 | D-CU3* | RESERVE |

Bytes 0 to 7 represent the control section TEL of the data header HEAD6 of the re-extended unscheduled second telegram fragment ECAT2 having the identification information DEST-MAC-ID and the length information TEL-LEN. One byte of the identification information DEST-MAC-ID is provided analogously to the above-mentioned description for the counter. The counter is set to the value three by the first distribution node CU1, as described above.

Byte 8 of data field D-CU1* of the first distribution node CU1 comprises the second telegram information. The second telegram information indicates by the value CMD=4 that the first distribution node CU1 has divided up the re-extended first telegram fragment ECAT1 into two fragments ECAT2, ECAT3, wherein at first the second telegram fragment ECAT2 is transmitted and according thereto Table 3 indicates the structure of the data header HEAD6 of the associated second telegram fragment ECAT2.

Subdividing the re-extended first telegram fragment ECAT1 into two telegram fragments ECAT2, ECAT3 may e.g. be due to the fact that the remaining time slot of the transmission interface of the first distribution node CU1 remaining until the next scheduled telegram is transmitted only suffices for sending a smaller telegram fragment having a shorter transmission time.

In the second telegram information, byte 9 further comprises the distribution-node identification FRAME-ID of the first distribution node CU1 which has the value X1 and may, as the other distribution-node identifications, be increased with regard to value for each new unscheduled telegram.

Bytes 10 to 11 of the data field D-CU1* of the first telegram information comprise the telegram offset OFFSET, which has the telegram offset OFFSET value n=0.

Byte 12 of the data field D-CU1* NEXT indicates by the value 1 that further telegram fragments ECAT3, ECAT4 still have to be transmitted.

Bytes 13 to 15 form reserved bytes RESERVE that may be unoccupied.

Bytes 16 to 23 are reserved for the data field D-CU2* of the second distribution node CU2 and may be structured and occupied analogously to the above description.

Similarly, bytes 24 to 31 may be occupied and structured in the same manner as in the above description with regard to data field D-CU3* that is associated with the third distribution node CU3.

The data header HEAD7 of the third telegram fragment ECAT3 having the eighth telegram structure TEL8 in FIG. 2B may e.g. be structured as shown in Table 4.

TABLE 4

| Byte number | Data header section | Denotation |
|---|---|---|
| 0-5 | TEL | DEST-MAC-ID |
| 6-7 | TEL | TEL-LEN |
| 8 | D-CU1* | CMD (value 4) |
| 9 | D-CU1* | FRAME-ID (value X1) |
| 10-11 | D-CU1* | OFFSET (value N) |
| 12 | D-CU1* | NEXT (value 0) |
| 13-15 | D-CU1* | RESERVE |
| 16 | D-CU2* | CMD (value 3) |
| 17 | D-CU2* | FRAME-ID (value X2) |
| 18-23 | D-CU2* | RESERVE |
| 24 | D-CU3* | CMD (value 4) |
| 25 | D-CU3* | FRAME-ID (value X3) |
| 26-27 | D-CU3* | OFFSET |
| 28 | D-CU3* | NEXT (value 1) |
| 29-31 | D-CU3* | RESERVE |

Structure and occupation of bytes 0 to 31 may thereby correspond to the structure and the occupation of the bytes of data header HEAD6 of the second telegram fragment ECAT2 in Table 3. For this reason, the differences and the possible differences of byte occupation of data header HEAD7 compared to data header HEAD6 are shown for the following description.

Bytes 10 to 11 of data field D-CU1* of the first distribution node CU1 comprise the telegram offset OFFSET in the second telegram information. The telegram offset OFFSET may have a value n=N for the data header HEAD7 of the third telegram fragment ECAT3 as the position of the user-data block contained in the third telegram fragment ECAT3 may correspond to the position N. For comparison, the position of the first user-data block contained in the second telegram fragment ECAT2 corresponds to the value n=0.

A possible difference of the structure of the data header HEAD7 compared to the structure of data header HEAD6 may be in bytes 6 to 7 of Table 4. Bytes 6 to 7 indicate the telegram length TEL-LEN, including the data header HEAD7. It is possible that the third telegram fragment ECAT3 differs from the second telegram fragment ECAT2 with regard to length. As a result, the value for the telegram length TEL-LEN may vary for the third unscheduled telegram fragment ECAT3 in Table 4.

Alternatively, it is possible that the first distribution node CU1 does not fragment the unscheduled first telegram fragment ECAT1 received from the distribution node CU2 before the first distribution node forwards the telegram to the first subscriber of the first network segment. Here, receipt of the unscheduled first telegram fragment ECAT1 and evaluation of the associated data header of the unscheduled first telegram fragment ECAT1 may take place analogously to the procedure described above in conjunction with the receipt of the unscheduled second telegram fragment ECAT2 having the seventh telegram structure TEL7 by the first distribution node. The structure of the not further fragmented first telegram fragment ECAT1 may be sent from the first distribution node CU1 via its first input/output interface to the first subscriber T1 in the first network segment N1. The data header of the not re-fragmented telegram fragment ECAT1 may be structured according to Table 5.

TABLE 5

| Byte number | Data header section | Denotation |
|---|---|---|
| 0-5 | TEL | DEST-MAC-ID |
| 6-7 | TEL | TEL-LEN |
| 8 | D-CU1* | CMD (value 3) |
| 9 | D-CU1* | FRAME-ID (value X1) |
| 10-15 | D-CU1* | RESERVE |
| 16 | D-CU2* | CMD (value 3) |
| 17 | D-CU2* | FRAME-ID (value X2) |
| 18-23 | D-CU2* | RESERVE |
| 24 | D-CU3* | CMD (value 4) |
| 25 | D-CU3* | FRAME-ID (value X3) |
| 26-27 | D-CU3* | OFFSET |
| 28 | D-CU3* | NEXT (value 1) |
| 29-31 | D-CU3* | RESERVE |

In analogy to the other Tables 1 to 4, bytes 0 to 7 are reserved for control section TEL of the data header. They comprise the identification information DEST-MAC-ID as well as a byte of the DEST-MAC-ID comprising the counter. The control section TEL furthermore comprises, in bytes 6 to 7, the length TEL-LEN of the first telegram fragment ECAT1 that has not been further fragmented.

Byte 8 of the data field D-CU1* comprises the first telegram information. In the first telegram information, the first distribution node CU1 characterizes by the allocation CMD=3 that it fully transmits the first telegram fragment ECAT that has not been further fragmented to the first subscriber. In this context, the first telegram information may further comprise the distribution-node identification FRAME-ID of the first distribution node having the value X1 in the byte 9.

Bytes 10 to 15 of the data field D-CU1* may be provided as reserved bytes RESERVE.

Moreover, bytes 16 to 23 for data field D-CU2* of the second distribution node CU2 as well as bytes 24 to 31 for the data field D-CU3* of the third distribution node CU3 may be occupied in analogy to the above description, in which the third distribution node CU3 fragments the unscheduled EtherCAT telegram ECAT and the second distribution node CU2 forwards the first telegram fragment ECAT1 to the first distribution node CU1 without renewed fragmentation.

After transmitting the third EtherCAT telegram fragment ECAT1 to the first subscriber T1 by the first distribution node CU1, e.g. the fourth EtherCAT telegram fragment ECAT4 having the telegram structure TEL9 and the data header HEAD8 may be transmitted by the first distribution node CU1 to the first subscriber T1, the master subscriber, in the first network segment N1. In order to avoid repetitions, it is assumed that the fourth EtherCAT telegram fragment ECAT4 was transmitted analogously to the above description with regard to the first EtherCAT telegram fragment ECAT1 by the third distribution node CU3 to the second distribution node CU2 and from the second distribution node CU2 to the first distribution node CU1. In contrast to the previous description, the fourth EtherCAT telegram fragment ECAT4 is not again fragmented during transmission by the second distribution node CU2 to the first distribution node CU1. As a result, the telegram structure TEL9 shown in FIG. 2B is provided during transmission of the fourth EtherCAT telegram fragment ECAT4 from the first distribution node CU1 to the first subscriber T1. Thereby, the same input/output interfaces of the distribution nodes that are provided as the respective transmission interfaces of the distribution nodes may be used for the transmission of the unscheduled fourth telegram fragment ECAT4, as described above.

The fourth EtherCAT telegram fragment ECAT4 may e.g. correspond to the counterpart of the first EtherCAT telegram fragment ECAT1 and, together with the unscheduled first EtherCAT telegram fragment ECAT1 that was fragmented to result in second and third telegram fragments ECAT2, ECAT3, form the complete unscheduled EtherCAT telegram fragment ECAT. For example, the time slot for transmitting the fourth EtherCAT telegram fragment ECAT4 by the third, second and first distribution node may suffice in order to fully transmit the unscheduled fourth telegram fragment ECAT4 having the telegram structure TEL9 of FIG. 2B to the master subscriber. The distribution nodes characterize the full transmission of the fourth telegram fragment ECAT4 by the first telegram information, in analogy to the above description. Alternatively, renewed fragmenting or, respectively, multiple fragmenting of the unscheduled fourth telegram fragment ECAT4 for transmission is conceivable. The respective distribution node further fragmenting the unscheduled fourth EtherCAT telegram fragment ECAT4 then deposits the fragmentation of the fourth telegram fragment ECAT4 in the second telegram information as described above together with the distribution-node identification. Here, a description of the occupation of the individual bytes for the data header HEAD8 of the unscheduled fourth telegram fragments ECAT4 having the telegram structure TEL9 according to Tables 1 to 5 is not given since the occupation of the bytes of the data header HEAD8 may be carried out in a comparable manner as in the previous tables.

The first subscriber T1 in the first network segment N1 that may e.g. be configured as a master subscriber has to reassemble the telegram fragments to result in a complete telegram. Alternatively, the first, second and/or third distribution node CU1, CU2 and/or CU3 may reassemble the individual telegram fragments that have e.g. accumulated in their memories due to the respective data-transmission paths being occupied. This procedure may furthermore contribute to an efficient data transmission, as less data headers have to be transmitted.

The first subscriber T1 or, respectively, the master subscriber recognizes the telegram fragments belonging to an unscheduled EtherCAT telegram by the distribution-node identifications FRAME-IDs of all data fields D-CU1*, D-CU2*, D-CU3* of the distribution nodes in the data header of the unscheduled telegrams being identical for all telegram fragments. In the shown embodiment example, the distribution-node identifications FRAME-IDs of the data fields D-CU1*, D-CU2*, D-CU3* of the distribution nodes have the values X1 (first distribution node), X2 (second distribution node) and X3 (third distribution node) for the above-described first to fourth telegram fragments ECAT1-ECAT4. In a new unscheduled telegram, the values of the distribution-node identifications FRAME-IDs would deviate from the stated values and thus allow for identifying said unscheduled EtherCAT telegram ECAT and for assigning possible first to fourth telegram fragments ECAT1-ECAT4 of the EtherCAT telegram ECAT.

The above-described data exchange is optimized for the EtherCAT protocol. For the EtherCAT protocol, it is necessary to remove the data header of the scheduled or, respectively, unscheduled telegram as the slave subscriber being the recipient of the scheduled or, respectively, unscheduled telegram is not able to process this part of the scheduled or, respectively, unscheduled telegram. For this reason, the data header of the distribution nodes to be run through on the forward run is gradually removed from the unscheduled telegram and respectively buffered, in order to be inserted into the unscheduled telegram on its way back and to be extended with additional information. Thereby, the master subscriber or the respective distribution nodes may generate the data header. Alternatively, it is conceivable that the slave subscriber is able to generate the data header of the unscheduled telegram.

The procedure may also be used in such distribution nodes that are e.g. embodied as switches in which the transmission time of the scheduled cyclic telegram is set via a configuration phase in the distribution nodes. In this manner, the throughput of unscheduled acyclic telegrams may be increased as a part of the unscheduled telegram, an unscheduled telegram fragment; however, the complete unscheduled telegram may or may not be transmitted before the acyclic phase has ended.

Furthermore, it is possible to use automation-communication networks that are not structured according to the master-slave-administration principle. All automation-communication networks may be used in which a first subscriber is arranged in a first network segment, a second subscriber in a second network segment and at least a distribution node is arranged between the two subscribers and a telegram or, respectively, data transmission is to take place between these two subscribers.

If a different protocol is used for exchanging data instead of the EtherCAT protocol in which the slave subscriber(s)

may process the data header, it is not necessary for the distribution nodes to remove the associated data field from the data header of the unscheduled telegram on the forward run of the unscheduled telegram to the slave subscriber or the slave subscribers. Alternatively, only the last distribution node may be embodied to remove the data fields of the distribution nodes from the data header of the unscheduled telegram, whereby this possibility may become obsolete if the slave subscriber(s) are able to process the data header of the unscheduled telegram. In both mentioned cases, the data header remains at the unscheduled telegram and may be evaluated by the distribution nodes and be forwarded together with the unscheduled telegram.

Furthermore, it is conceivable to use a correspondingly configured protocol for exchanging data as well as correspondingly embodied slave subscribers in the automation-communication network that may process the data header of the unscheduled telegram and insert the evaluation of the data header into the new unscheduled telegram that they send back to the master subscriber.

In some embodiments, in an automation-communication network, at least one distribution node is provided. The distribution node comprises a plurality of input/output interfaces that are each connected to at least one network segment, wherein in a first network segment a first subscriber and in a second network segment a second subscriber are arranged. Data are exchanged between the first and the second subscriber by telegrams, wherein the telegrams are realized as scheduled telegrams having a fixed transmission time for transmitting via the distribution node, and as unscheduled telegrams without a fixed transmission time for transmitting via the distribution node. The unscheduled telegrams each comprise control data for the distribution node and these in turn comprise a data field that is processed by the distribution node. The distribution node is configured to receive an unscheduled telegram on an input/output interface and to send an unscheduled telegram on a further input/output interface. Furthermore the distribution node is configured to determine a transmission duration for transmission of the unscheduled telegram. Moreover the distribution node is configured to determine a time slot of the input/output interface provided as the transmitting interface for the unscheduled telegram, said time slot remaining until a next scheduled telegram is transmitted, and to examine whether the unscheduled telegram with said transmitting duration can be transmitted within the remaining time slot. The distribution node is also configured to transmit the unscheduled telegram via the transmission interface if the unscheduled telegram with said transmission duration can be transmitted within the remaining time slot of the transmission interface up until transmission of a next scheduled telegram. Prior to transmission, the distribution node deposits a first telegram information in the data field of the control data, said telegram information indicating complete transmission of the unscheduled telegram. The distribution node fragments the unscheduled telegram if the telegram with the transmission duration cannot be transmitted within the remaining time slot of the transmission interface up until transmission of the next scheduled telegram. Furthermore, prior to transmission of the unscheduled telegram, the distribution node enters a second telegram information into the data field of the control data of the unscheduled telegram that indicates that the telegram is going to be fragmented and comprises an additional distribution-node identification that serves to discern the individual distribution nodes in the automation-communication network.

The present invention is described in detail in context with preferred embodiments and examples. Further embodiments and examples are contemplated that may comprise modifications or combinations of the described features. For this reason, the present invention is not limited to the disclosed examples, as a person skilled in the art may devise other variations without exceeding the scope of protection of the present invention as claimed.

The advantageous embodiments of the invention described above and/or indicated in the claims may be used individually or in any desired combination with one another—except e.g. in cases of expressly recited dependencies and alternatives.

The invention claimed is:

1. A method for transmitting data in an automation-communication network comprising at least one distribution node having a plurality of input/output interfaces that are each connected to at least one network segment,
   wherein in a first network segment a first subscriber and in a second network segment a second subscriber are arranged;
   wherein data are exchanged between the first subscriber and the second subscriber in the form of telegrams;
   wherein the telegrams are realized as scheduled telegrams characterized by a fixed transmission time for transmitting via the at least one distribution node and as unscheduled telegrams characterized by not having a fixed transmission time for transmitting via the at least one distribution node;
   wherein the unscheduled telegrams are each assigned control data for the distribution node and the control data comprise a data field that is processed by the distribution node;
   wherein the distribution node is configured to receive an unscheduled telegram on an input/output interface and to send the unscheduled telegram on a further input/output interface;
   wherein the distribution node is configured to determine a transmission duration for transmitting the unscheduled telegram;
   wherein the distribution node is configured to determine a time slot of the input/output interface provided as the transmitting interface for the unscheduled telegram, said time slot remaining until a next scheduled telegram is transmitted, and to examine whether the unscheduled telegram with said transmitting duration can be transmitted within the remaining time slot;
   wherein the distribution node transmits the unscheduled telegram via the transmission interface if the unscheduled telegram with said transmission duration can be transmitted within the remaining time slot of the transmitting interface until the next scheduled telegram is transmitted;
   wherein the distribution node enters a first telegram information prior to the transmission of the unscheduled telegram into the data field of the control data of the unscheduled telegram;
   wherein the first telegram information indicates that the unscheduled telegram is fully transmitted;
   wherein the distribution node fragments the unscheduled telegram if the telegram with the transmission duration cannot be transmitted within the remaining time slot of the transmission interface up until transmission of the next scheduled telegram;

wherein the distribution node enters a second telegram information in the data field of the control data of the unscheduled telegram prior to transmitting the unscheduled telegram; and wherein the second telegram information indicates that the unscheduled telegram is going to be fragmented and comprises an additional distribution-node identification that serves to discern the individual distribution nodes in the automation-communication network.

2. The method according to claim 1, wherein a plurality of distribution nodes is arranged between the first subscriber and the second subscriber;

wherein a separate data field of the control data of the unscheduled telegram is assigned to each distribution node which is independently processed by the respective distribution node;

wherein the respective distribution node fragments the unscheduled telegram that is transmitted from the second subscriber to the first subscriber if the unscheduled telegram with the respective transmission duration cannot be transmitted within the remaining time slot of the transmission interface up until transmission of the next scheduled telegram by the respective distribution node;

wherein the respective distribution node enters a second telegram information in the assigned data field of the control data of the unscheduled telegram prior to transmitting the unscheduled telegram;

wherein the second telegram information indicates that the unscheduled telegram is going to be fragmented and comprises an additional distribution-node identification; and wherein the respective distribution node transmits the unscheduled telegram in fragments.

3. The method according to claim 1, wherein the distribution-node identification of the second telegram information allows for additional assigning to the corresponding unscheduled telegram; and wherein the distribution-node identification of the second telegram information is incremented for a new unscheduled telegram.

4. The method according to claim 1, wherein the respective distribution node inserts a telegram offset into its assigned data field of the control data of the unscheduled telegram, in the second telegram information, if the respective distribution node fragments the unscheduled telegram;

wherein the telegram offset indicates a value n comprising a position of a first user-data block contained in the unscheduled telegram; and wherein the first telegram fragment particularly comprises the telegram-offset value n=0.

5. The method according to claim 1, wherein the respective distribution node deposits in its assigned data field of the control data of the unscheduled telegram, in the second telegram information, that further telegram fragments are to be transmitted if the respective distribution node fragments the unscheduled telegram.

6. The method according to claim 1, wherein the telegrams are transmitted on a closed data-transmission path originating from the first subscriber to the second subscriber on its forward run, and back, originating from the second subscriber to the first subscriber on the return;

wherein the first subscriber arranged in the first network segment is realized as a master subscriber; and wherein the second subscriber arranged in the second network segment is realized as a slave subscriber;

wherein the data exchange between the master subscriber and the slave subscriber is triggered by the master subscriber in the form of the telegrams;

wherein the telegrams are realized as the scheduled telegrams with a fixed transmission time for transmission by the at least one distribution node and as the unscheduled telegrams without a fixed transmission time;

wherein the master subscriber generates a data header for the transmitted unscheduled telegrams to be transmitted to the slave subscriber on the forward run, the data header comprising a control section and subsequent thereto a separate distribution-node-data field for each distribution node to be run through;

wherein the distribution node generates a data header for the unscheduled telegrams of the slave subscriber to be transmitted on the way back to the master subscriber, the data header comprising a control section and a distribution-node-data field, if the unscheduled telegram does not comprise a data header on its way back; and wherein the subsequent distribution nodes supplement the data header for the unscheduled telegrams to be transmitted by the distribution-node data field assigned to the respective distribution node.

7. The method according to claim 1, wherein the control section of the unscheduled telegram comprises an indication of length of the unscheduled telegram; and wherein the indication of length of the unscheduled telegram comprises the length of the data header and a length of the user-data block of the unscheduled telegram.

8. The method according to claim 1, wherein the control section of the unscheduled telegram comprises a counter that, starting from the master subscriber, indicates the number of distribution nodes to be run through by the unscheduled telegram up until the slave subscriber or, respectively, starting from the slave subscriber, the number of distribution nodes to be run through by the unscheduled telegrams up until the master subscriber;

wherein the distribution node decrements the counter during circulation of the telegrams on the forward run from the master subscriber to the slave subscriber; and wherein the distribution node increments the counter during circulation of the telegrams on the way back from the slave subscriber to the master subscriber.

9. The method according to claim 1, wherein the scheduled telegrams are realized as cyclic telegrams serving to control an automation system; and wherein the unscheduled telegrams are realized as acyclic telegrams.

10. An automation-communication network having at least one distribution node comprising a plurality of input/output interfaces that are each connected to at least one network segment, wherein in a first network segment a first subscriber and in a second network segment a second subscriber are arranged, wherein data are exchanged between the first subscriber and the second subscriber in the form of telegrams;

wherein the telegrams are realized as scheduled telegrams characterized by a fixed transmission time for transmitting via the at least one distribution node and as unscheduled telegrams characterized by not having a fixed transmission time for transmitting via the at least one distribution node;

wherein the unscheduled telegrams are each assigned control data for the distribution node and the control data comprise a data field that is processed by the distribution node;

wherein the distribution node is configured to receive an unscheduled telegram on an input/output interface and to send the unscheduled telegram on a further input/output interface;

wherein the distribution node is configured to determine a transmission duration for transmission of the unscheduled telegram;

wherein the distribution node is configured to determine a time slot of the input/output interface provided as the transmitting interface for the unscheduled telegram, said time slot remaining until a next scheduled telegram is transmitted, and to examine whether the unscheduled telegram with said transmitting duration can be transmitted within the remaining time slot;

wherein the distribution node is configured to transmit the unscheduled telegram via the transmission interface if the unscheduled telegram with said transmission duration can be transmitted within the remaining time slot of the transmitting interface until the next scheduled telegram is transmitted;

wherein the distribution node is configured to enter a first telegram information prior to the transmission of the unscheduled telegram into the data field of the control data of the unscheduled telegram;

wherein the first telegram information indicates that the unscheduled telegram is fully transmitted;

wherein the distribution node is configured to fragment the unscheduled telegram if the telegram with the transmission duration cannot be transmitted within the remaining time slot of the transmission interface up until transmission of the next scheduled telegram;

wherein the distribution node is configured to enter a second telegram information in the data field of the control data of the unscheduled telegram prior to transmitting the unscheduled telegram; and wherein the second telegram information indicates that the unscheduled telegram is going to be fragmented and comprises an additional distribution-node identification that serves to discern the individual distribution nodes in the automation-communication network.

11. The automation-communication network according to claim 10, wherein between the first subscriber and the second subscriber a plurality of distribution nodes is arranged;

wherein a separate data field of the control data of the unscheduled telegram is assigned to each distribution node which is independently processed by the respective distribution node;

wherein the respective distribution node is configured to fragment the unscheduled telegram that is transmitted from the second subscriber to the first subscriber if the unscheduled telegram with the respective transmission duration cannot be transmitted within the remaining time slot of the transmission interface up until transmission of the next scheduled telegram by the respective distribution node, and wherein the respective distribution node is configured to enter a second telegram information in the assigned data field of the control data of the unscheduled telegram;

wherein the second telegram information indicates that the telegram is going to be fragmented and comprises an additional distribution-node identification; and wherein the respective distribution node transmits the unscheduled telegram in fragments.

12. The automation-communication network according to claim 10, wherein the distribution-node identification of the second telegram information allows for additional assigning of the corresponding unscheduled telegram; and wherein the distribution node is configured to increment the distribution-node identification of the second telegram information for a new unscheduled telegram.

13. The automation-communication network according to claim 10, wherein the respective distribution node is configured to note a telegram offset in the assigned data field of the control data of the unscheduled telegram, in the second telegram information, if the respective distribution node fragments the unscheduled telegram;

wherein the telegram offset indicates a value n which comprises a position of a first user-data block contained in the unscheduled telegram; and wherein the first telegram fragment particularly has the telegram-offset value n=0.

14. The automation-communication network according to claim 10, wherein the respective distribution node is configured to deposit in its assigned data field of the control data of the unscheduled telegram, in the second telegram information, that further telegram fragments are to be transmitted if the respective distribution node fragments the unscheduled telegram.

15. The automation-communication network according to claim 10, wherein the telegrams are transmitted on a closed data-transmission path originating from the first subscriber to the second subscriber on its forward run, and back, originating from the second subscriber to the first subscriber on the return;

wherein the first subscriber arranged in the first network segment is realized as a master subscriber; and wherein the second subscriber arranged in the second network segment is realized as a slave subscriber;

wherein the master subscriber is configured to trigger the data exchange between the master subscriber and the slave subscriber in the form of the telegrams;

wherein the telegrams are realized as the scheduled telegrams with a fixed transmission time for transmission by the at least one distribution node and as the unscheduled telegrams without a fixed transmission time;

wherein the master subscriber is configured to generate a data header for the transmitted unscheduled telegrams to be transmitted to the slave subscriber on the forward run, the data header comprising a control section and subsequent thereto a separate distribution-node-data field for each distribution node to be run through;

wherein the distribution node is configured to generate a data header for the unscheduled telegrams of the slave subscriber to be transmitted on the way back to the master subscriber, the data header comprising a control section and a distribution-node-data field, if the unscheduled telegram does not comprise a data header on its way back; and wherein the subsequent distribution nodes are configured to supplement the data header for the unscheduled telegrams to be transmitted by the distribution-node data field assigned to the respective distribution node.

16. The automation-communication network according to claim 10, wherein the control section of the unscheduled telegram comprises an indication of length of the unscheduled telegram; and wherein the indication of length of the unscheduled telegram comprises the length of the data header and a length of the user-data block of the unscheduled telegram.

17. The automation-communication network according to claim 10, wherein the control section of the unscheduled telegram comprises a counter that, starting from the master subscriber, indicates the number of distribution nodes to be run through by the unscheduled telegram up until the slave subscriber or, respectively, starting from the slave subscriber, indicates the number of distribution nodes to be run through by the unscheduled telegrams up until the master subscriber;

wherein the distribution node is configured to decrement the counter during circulation of the telegrams on the forward run from the master subscriber to the slave subscriber; and wherein the distribution node is configured to increment the counter during circulation of the telegrams on the way back from the slave subscriber to the master subscriber.

18. The automation-communication network according to claim 10, wherein the scheduled telegrams are realized as cyclic telegrams serving to control an automation system; and wherein the unscheduled telegrams are realized as acyclic telegrams.

19. A distribution node for an automation-communication network, wherein the distribution node having a plurality of input/output interfaces that are each connected to at least one network segment, wherein in a first network segment a first subscriber and in a second network segment a second subscriber are arranged;

wherein data are exchanged between the first subscriber and the second subscriber in the form of telegrams;

wherein the telegrams are realized as scheduled telegrams characterized by a fixed transmission time for transmitting via the at least one distribution node and as unscheduled telegrams characterized by not having a fixed transmission time for transmitting via the at least one distribution node;

wherein the unscheduled telegrams are each assigned control data for the distribution node and the control data comprise a data field that is processed by the distribution node;

wherein the distribution node is configured to receive an unscheduled telegram on an input/output interface and to send the unscheduled telegram on a further input/output interface;

wherein the distribution node is configured to determine a transmission duration for transmitting the unscheduled telegram;

wherein the distribution node is configured to determine a time slot of the input/output interface provided as the transmitting interface for the unscheduled telegram, said time slot remaining until a next scheduled telegram is transmitted, and to examine whether the unscheduled telegram with said transmitting duration can be transmitted within the remaining time slot;

wherein the distribution node transmits the unscheduled telegram via the transmission interface if the unscheduled telegram with said transmission duration can be transmitted within the remaining time slot of the transmitting interface until the next scheduled telegram is transmitted;

wherein the distribution node enters a first telegram information prior to the transmission of the unscheduled telegram into the data field of the control data of the unscheduled telegram;

wherein the first telegram information indicates that the unscheduled telegram is fully transmitted;

wherein the distribution node fragments the unscheduled telegram if the telegram with the transmission duration cannot be transmitted within the remaining time slot of the transmission interface up until transmission of the next scheduled telegram;

wherein the distribution node enters a second telegram information in the data field of the control data of the unscheduled telegram prior to transmitting the unscheduled telegram; and wherein the second telegram information indicates that the unscheduled telegram is going to be fragmented and comprises an additional distribution-node identification that serves to discern the individual distribution nodes in the automation-communication network.

20. The distribution node according to claim 19, wherein a plurality of distribution nodes is arranged between the first subscriber and the second subscriber;

wherein a separate data field of the control data of the unscheduled telegram is assigned to each distribution node which is independently processed by the respective distribution node;

wherein the respective distribution node fragments the unscheduled telegram that is transmitted from the second subscriber to the first subscriber if the unscheduled telegram with the respective transmission duration cannot be transmitted within the remaining time slot of the transmission interface up until transmission of the next scheduled telegram by the respective distribution node;

wherein the respective distribution node enters a second telegram information in the assigned data field of the control data of the unscheduled telegram prior to transmitting the unscheduled telegram; and wherein the second telegram information indicates that the unscheduled telegram is going to be fragmented and comprises an additional distribution-node identification;

wherein the respective distribution node transmits the unscheduled telegram in fragments.

21. The distribution node according to claim 19, wherein the respective distribution node is configured to note a telegram offset in the assigned data field of the control data of the unscheduled telegram, in the second telegram information, if the respective distribution node fragments the unscheduled telegram;

wherein the telegram offset indicates a value n which comprises a position of a first user-data block contained in the unscheduled telegram; and wherein the first telegram fragment particularly has the telegram-offset value n=0.

22. The distribution node according to claim 19, wherein the respective distribution node deposits in its assigned data field of the control data of the unscheduled telegram, in the second telegram information, that further telegram fragments are to be transmitted if the respective distribution node fragments the unscheduled telegram.

* * * * *